(12) United States Patent
Nandi et al.

(10) Patent No.: US 11,996,715 B2
(45) Date of Patent: May 28, 2024

(54) HANDLING OF BATTERY LOSS EVENT

(71) Applicant: TEXAS INSTRUMENTS INCORPORATED, Dallas, TX (US)

(72) Inventors: Prajit Nandi, Kolkata (IN); Vasishta Kidambi, Atlanta, GA (US); Naga Venkata Prasadu Mangina, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 413 days.

(21) Appl. No.: 17/513,836

(22) Filed: Oct. 28, 2021

(65) Prior Publication Data
US 2023/0138627 A1     May 4, 2023

(51) Int. Cl.
*H02J 7/00*     (2006.01)

(52) U.S. Cl.
CPC .......... *H02J 7/0034* (2013.01); *H02J 7/0047* (2013.01); *H02J 7/0063* (2013.01); *H02J 7/00711* (2020.01); *H02J 7/007186* (2020.01)

(58) Field of Classification Search
CPC ...... H02J 7/0034; H02J 7/0031; H02J 7/0047; H02J 7/0063; H02J 7/00711; H02J 7/007186
See application file for complete search history.

(56) References Cited

U.S. PATENT DOCUMENTS

| 11,735,933 B2 * | 8/2023 | Nandi | H02J 7/0034 |
| | | | 361/84 |
| 2008/0297113 A1 * | 12/2008 | Saeki | H01M 16/006 |
| | | | 320/128 |
| 2011/0057625 A1 * | 3/2011 | Ashida | H02J 7/00714 |
| | | | 320/162 |
| 2018/0109187 A1 * | 4/2018 | Eggermont | G01R 19/08 |
| 2018/0278072 A1 * | 9/2018 | Lee | H02J 7/007182 |
| 2023/0336009 A1 * | 10/2023 | Nandi | H02J 7/0034 |

* cited by examiner

*Primary Examiner* — Jared Fureman
*Assistant Examiner* — Nicolas Bellido
(74) *Attorney, Agent, or Firm* — Charles F. Koch; Frank D. Cimino

(57) ABSTRACT

In some examples, a controller circuit comprises: a voltage subtractor circuit having a subtractor output and first and second subtractor inputs, in which the first subtractor input is adapted to be coupled to a first current terminal of a transistor, the second subtractor input is adapted to be coupled to a second current terminal of the transistor; a gate control circuit having a gate control input and a gate control output, the gate control input coupled to the subtractor output, the gate control output adapted to be coupled to a gate of the transistor; and a discharge circuit having a discharge circuit input and a discharge circuit output, the discharge circuit input coupled to the gate control circuit, the discharge circuit output adapted to be coupled to the first current terminal of the transistor.

21 Claims, 15 Drawing Sheets

HANDLING OF BATTERY LOSS EVENT

BACKGROUND

An electric power system that transfers electric power from a battery to a load may include a protection system to protect the load from a reverse battery connection, where the load may receive a negative input voltage from the battery. The protection system can isolate the load from the negative input voltage to prevent the load from being damaged by the negative input voltage. Some examples of the protection system can also block a reverse current from flowing from the load to the battery, to allow the load side additional time to operate before turning off. It is also desirable that the protection system can handle other events, such as a battery loss event in which the battery is disconnected from or otherwise cannot transfer electric power to the electric power system.

SUMMARY

A controller circuit includes a voltage subtractor circuit, a gate control circuit, and a discharge circuit. The voltage subtractor circuit has a subtractor output and first and second subtractor inputs. The first subtractor input is adapted to be coupled to a first current terminal of a transistor. The second subtractor input is adapted to be coupled to a second current terminal of the transistor. The gate control circuit has a gate control input and a gate control output. The gate control input is coupled to the subtractor output. The gate control output is adapted to be coupled to a gate of the transistor. The discharge circuit has a discharge circuit input and a discharge circuit output. The discharge circuit input is coupled to the gate control circuit. The discharge circuit output is adapted to be coupled to the first current terminal of the transistor.

In a method, a first voltage is received via a first terminal of a controller circuit. The first terminal is coupled to a transistor's first current terminal. A second voltage is received via a second terminal of the controller circuit. The second terminal is coupled to the transistor's second current terminal. Based on the first voltage and the second voltage, a gate voltage of the transistor is provided via a third terminal of the controller circuit. The third terminal of the controller circuit is coupled to a gate of the transistor. Based on an indication of whether the gate voltage has been changed, a charge is removed from the first diffusion of the transistor via the first terminal.

DETAILED DESCRIPTION

As described above, an electric power system may include a protection system to protect the load from a reverse battery connection. In a case where the electric power system is part of a vehicle, reverse battery connection may occur during maintenance of the vehicle's battery or jump start of the vehicle. Without the protection system, the load may receive a negative voltage from the battery when the battery is reversely connected. The negative voltage can cause huge current to flow from various electronic components of the load, such as electrostatic discharge (ESD) circuits, voltage regulators, etc., which can cause severe damage to these components.

The protection system can include a controller circuit and a transistor. The transistor can include a body diode, of which the anode can be coupled to the battery and the cathode can be coupled to the load. In a reverse battery connection, the battery may output a negative voltage, and the controller circuit can turn off/disable the transistor and rely on the reverse-biased body diode to isolate the load from the negative voltage, and to prevent a reverse current from flowing from the load back to the battery. If the battery is connected in the correct polarities, the controller circuit can turn on/enable the transistor to transmit a positive voltage and a forward current from the battery to the load. For reasons to be described below, the controller circuit may repeatedly enable and disable the transistor in a battery loss event where the battery is disconnected from (or otherwise does not drive) the anode. Example techniques described herein reduce or even eliminate the repeated enabling and disabling of the transistor by the controller circuit in a battery loss event, which can improve the predictability of the protection system's behavior in the battery loss event.

Figure 1:
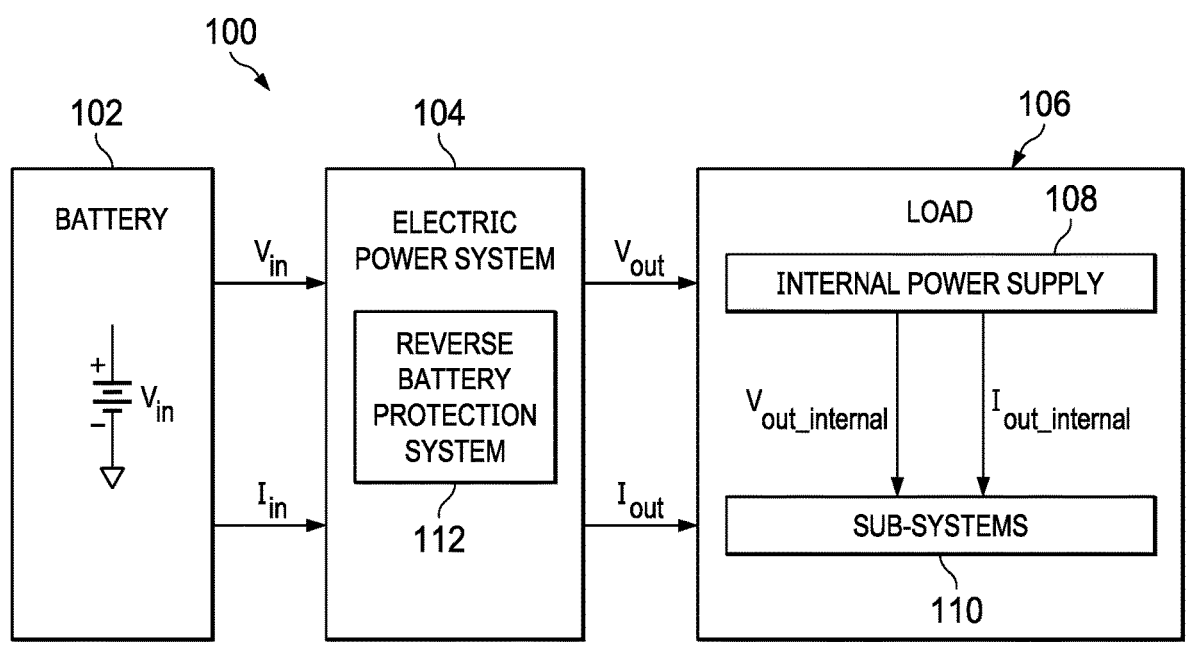
FIG. 1 is a schematic diagram of an electric power transfer system in accordance with various examples.

FIG. 1 illustrates an example of a system 100. System 100 may include a battery 102, an electric power system 104, and a load 106. Load 106 may include an internal power supply 108, which can include a linear regulator (e.g., a low dropout regulator) and/or a switch mode regulator (e.g., a buck converter, a boost converter, a buck-boost converter, etc.) to provide a supply voltage, and a holdup capacitor to supply a current. Load 106 may further include subsystems 110 that draw power from internal power supply 108. Both internal power supply 108 and subsystems 110 can include various electronic components.

Electric power system 104 is configured to transfer electric power from battery 102 to load 106. Electric power system 104 may receive a voltage $V_{in}$ and a current $I_{in}$, and provide a voltage $V_{out}$ and a current $I_{out}$ to load 106. Internal power supply 108 can receive voltage $V_{out}$ and current $I_{out}$ from electric power system 104 and provide a voltage $V_{out\_internal}$ and a current $I_{out}$ internal to subsystems 110. Voltage $V_{out}$ and current $I_{out}$ provided by electric power system 104 can be based on, respectively, voltage $V_{in}$ and current $I_{in}$ provided by battery 102. Also, voltage $V_{out\_internal}$ and current $I_{out\_internal}$ can be based on a configuration of internal power supply 108 and subsystems 110. For example, $V_{out\_internal}$ can be a fraction of $V_{out}$ to provide a reduced supply voltage required by subsystems 110, and $I_{out\_internal}$ can be reduced from $I_{in}$ due to power consumption by electric power system 104 and internal power supply 108. In FIG. 1, the positive terminal of battery 102 can be coupled to electric power system 104 to supply a positive voltage $V_{in}$, while the negative terminal of battery 102 can be coupled to ground. With such configuration, voltages $V_{out}$ and $V_{out\_internal}$ can be positive, and currents $I_{in}$, $I_{out}$, and $I_{out\_internal}$ can be part of a forward current that flows from battery 102 to load 106.

In some examples, electric power system 104 can include a reverse battery protection system 112 to protect load 106 from a reverse battery connection, where the positive terminal of battery 102 is coupled to ground and the negative terminal of battery 102 is coupled to electric power system 104. As a result, battery 102 may transmit a negative voltage, such as $-V_{in}$, to electric power system 104. Without reverse battery protection system 112, electric power system may transmit the negative voltage to load 106. The negative voltage can cause a huge current to flow from various electronic components of load 106, such as electrostatic discharge (ESD) circuits, voltage regulators of internal power supply 108, etc., which can cause severe damage to these components. Moreover, a reverse current may also flow from load 106 back to battery 102. The reverse current may discharge the holdup capacitor of internal power supply 108 and reduces the holdup capacitor's capability of supplying power to subsystems 110. Reverse battery protection system 112 can isolate load 106 from the negative voltage $-V_{in}$. In some examples, reverse battery protection system 112 can also block the reverse current from flowing from load 106 to battery 102, to allow subsystems 110 additional time to operate before turning off.

FIGS. 2A through 2F illustrate examples of internal components of reverse battery protection system 112 of system 100 and their operations. Referring to the left side of FIG. 2A, reverse battery protection system 112 can include a controller circuit 200 and a transistor 202. Transistor 202 can be an n-channel FET (NFET) or a p-channel FET (PFET). Transistor 202 can have a gate 204, a first current terminal 206, and a second current terminal 208. A body diode 210 can be formed at a p-n junction between first current terminal 206 and second current terminal 208, with first current terminal 206 being an anode (denoted "A" in the figures) and second current terminal 208 being a cathode (denoted "C" in the figures). In a case where transistor 202 is an NFET, first current terminal 206 can be a source whereas second current terminal 208 can be a drain. In a case where transistor 202 is a PFET, first current terminal 206 can be a drain whereas second current terminal 208 can be a source. In system 100, first current terminal 206 can be coupled to battery 102 at a node 220, and second current terminal 208 can be coupled to load 106 at a node 222.

Figure 2A:
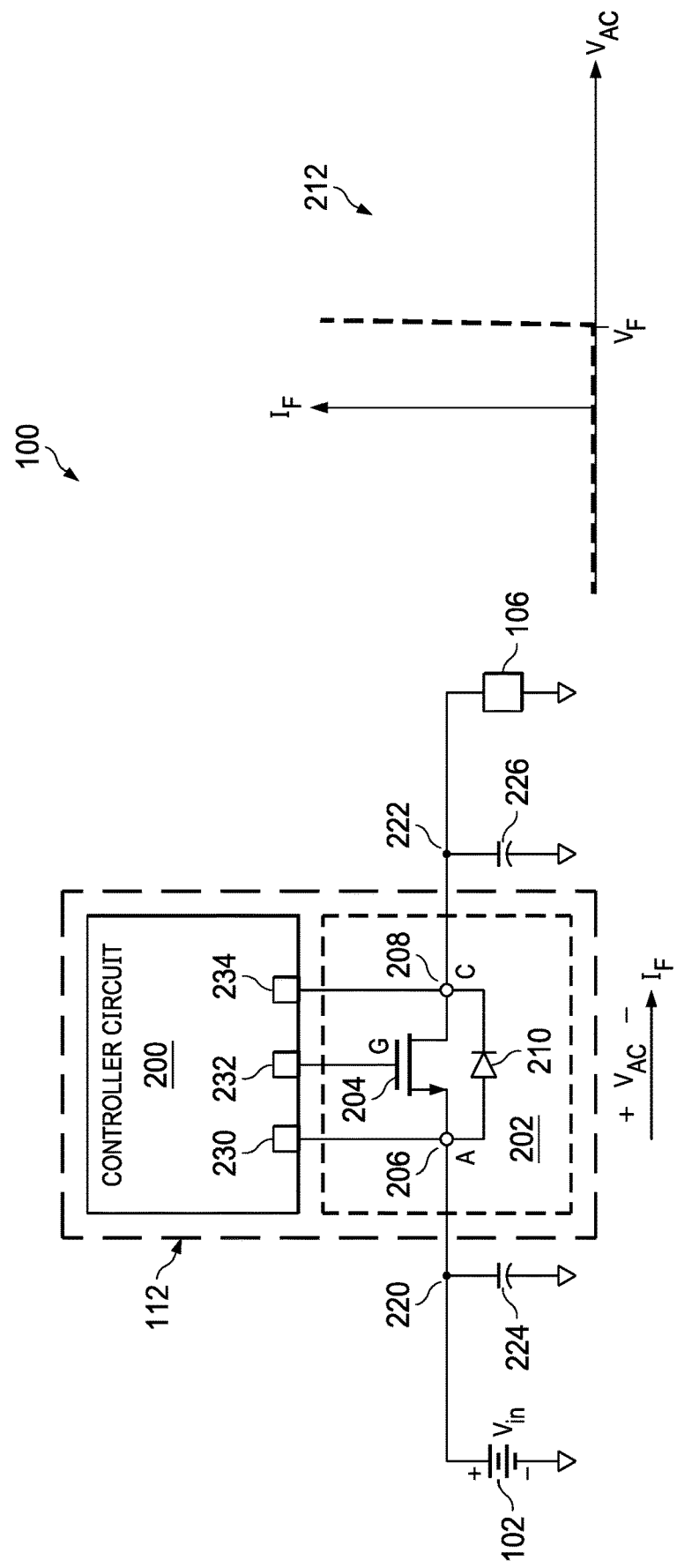
FIGS. 2A through 2F illustrate examples of internal components of a protection system and their operations.

In FIG. 2A, system 100 may include a capacitor 224 and a capacitor 226. Capacitor 224 can model a combination of parasitic capacitances at node 220, such as capacitances of wires and electrical connectors between battery 102 and transistor 202, the junction capacitance at first current terminal 206, etc. Moreover, capacitor 226 can model a combination of parasitic capacitances at node 222, such as capacitances of wires and electrical connectors between load 106 and transistor 202, the junction capacitance at second current terminal 208, etc. Capacitor 226 can also include a physical hold up capacitor to provide a temporary power supply to load 106 when transistor 202 is disabled.

Transistor 202 can be coupled to and controlled by controller circuit 200 to emulate an ideal diode having the same anode and cathode as body diode 210. In some examples, controller circuit 200 can include a terminal 230 adapted to be coupled to first current terminal 206. First current terminal 206 can be the anode of the ideal diode. Controller circuit 200 can also include a terminal 232 adapted to be coupled to gate 204 of transistor 202, and a terminal 234 adapted to be coupled to second current terminal 208 of transistor 202. Second current terminal 208 can be the cathode of the ideal diode. Terminals 230, 232, and 234 can include interconnects (e.g., chip-chip interconnects, traces on printed circuit board (PCB), etc.) that allow signals (e.g., current, voltage, etc.) to flow between controller circuit 200 and transistor 202. Controller circuit 200 can monitor the anode voltage $V_A$ at first current terminal 206 and the cathode voltage $V_C$ at second current terminal 208, and adjust the voltage of gate 204 of transistor 202 via terminal 232 responsive to changes of the anode-cathode voltage $V_{AC}$ to emulate an ideal diode coupled between battery 102 and load 106.

The right side of FIG. 2A illustrates an example transfer function graph 212 of an ideal diode to be emulated by transistor 202. Transfer function graph 212 illustrates a relationship between the amount of a forward current $I_F$ conducted by the diode, from anode to cathode, with respect a difference voltage between the anode and cathode $V_{AC}$. If $V_{AC}$ is below a forward voltage $V_F$, the diode can be reverse-biased, and no forward current (or a minimum amount of forward current) flows through the diode. If $V_{AC}$ is above the forward voltage $V_F$, the diode is forward bias and can conduct a forward current $I_F$. When the diode is forward-biased, the anode-cathode voltage $V_{AC}$ can remain constant at $V_F$ independent of the amount of forward current $I_F$ being conducted, so that the cathode voltage $V_C$ can be equal to the anode voltage $V_A$ minus the forward voltage $V_F$.

To emulate the ideal diode, in a case where $V_{AC}$ is above a forward voltage threshold representing the forward voltage of the ideal diode, controller circuit 200 can increase the gate-source voltage ($V_{GS}$) of transistor 202 (if transistor 202 is an NFET), or the source-gate voltage ($V_{SG}$) of transistor 202 (if transistor 202 is a PFET), to be above a threshold voltage $V_{th}$ of the transistor. Raising $V_{GS}$ ($V_{SG}$) to above $V_{th}$ can turn on/enable transistor 202 by forming a conduction channel between first current terminal 206 and second current terminal 208 under gate 204. The conduction channel can transmit a positive voltage and a forward/positive current from battery 102 to load 106. However, in a case where $V_{AC}$ is below the forward voltage threshold, controller circuit 200 can reduce the gate-source voltage $V_{GS}$ (if transistor 202 is NFET) or source-gate voltage $V_{SG}$ (if transistor 202 is PFET) to be below the threshold voltage $V_{th}$. Dropping $V_{GS}$ (or $V_{SG}$) below $V_{th}$ can turn off/disable transistor 202 by removing (or at least reducing) the conduction channel. Body diode 210 is reverse-biased due to $V_{AC}$ being below the forward voltage threshold, and the reverse-biased body diode can block a negative voltage and a reverse/negative current from reaching load 106 from battery 102.

Although transfer function graph 212 shows that an ideal diode has a single forward voltage $V_F$, in some examples controller circuit 200 can enable a conduction channel of transistor 202 (between first current terminal 206 and second current terminal 208) in response to $V_{AC}$ exceeding multiple thresholds, which can indicate that the battery is connected with the correct polarity. Controller circuit 200 can also disable/remove the conduction channel of transistor 202 to block a reverse current/negative voltage in response to $V_{AC}$ being below a reverse bias threshold, which can indicate a reverse battery connection. Such arrangements can improve the robustness of system 100 in light of transient noises.

Figure 2B:
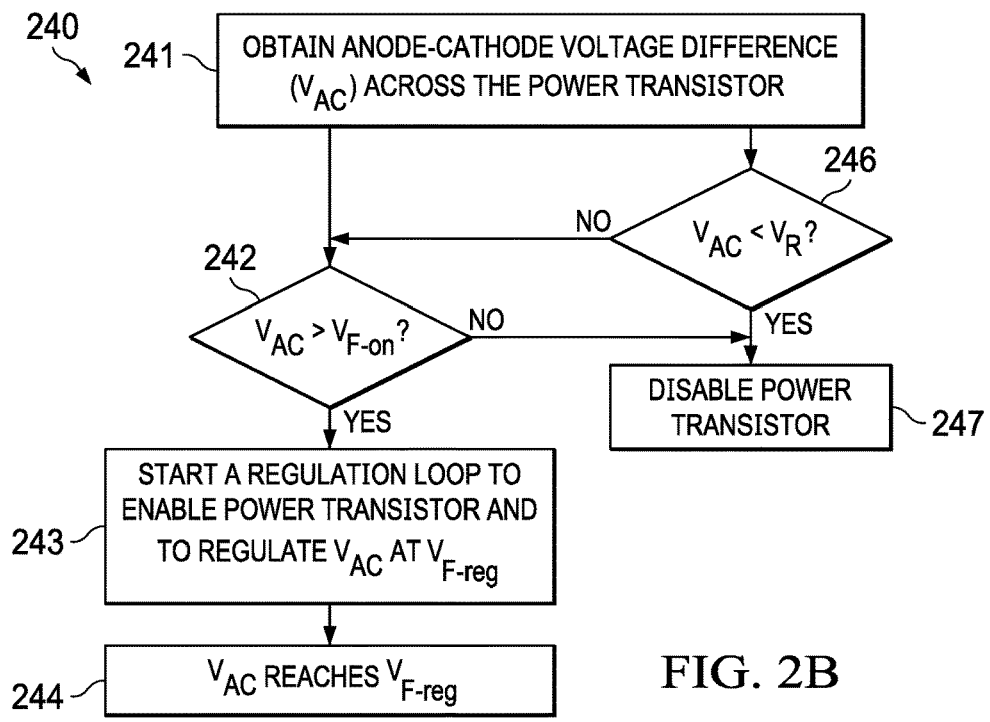

FIG. 2B illustrates a flowchart of an example method 240 performed by controller circuit 200 in controlling transistor 202. Method 240 can be performed after controller circuit 200 starts up and has not yet started enabled transistor 202.

In step 241, controller circuit 200 can determine an anode-cathode voltage ($V_{AC}$) across transistor 202. Controller circuit 200 can monitor the anode voltage ($V_A$) at terminal 230 and the cathode voltage ($V_C$) at terminal 234. Controller circuit 200 can include a subtraction circuit (e.g., implemented using a differential amplifier) to subtract $V_C$ from $V_A$ to obtain $V_{AC}$.

Controller circuit 200 can then proceed to compare $V_{AC}$ with a forward conduction threshold voltage $V_{F-on}$, in step 242. If $V_{AC}$ exceeds $V_{F-on}$, controller circuit 200 can start a regulation loop to raise the gate-source voltage $V_{GS}$ (or $V_{SG}$ if transistor 202 is PFET) to enable a conduction channel of transistor 202, and to regulate $V_{AC}$ at a target forward voltage $V_{F-reg}$, in step 243. $V_{F-reg}$ can represent $V_F$ of an ideal diode in transfer function graph 212 of FIG. 2A, and transistor 202 can be controlled to emulate a forward-biased diode. In step 244, $V_{AC}$ reaches (and can be regulated) at $V_{F-reg}$.

The forward conduction threshold voltage $V_{F-on}$ can be made higher than $V_{F-reg}$. By having $V_{AC}$ to be higher than $V_{F-on}$ (and to be much higher than $V_{F-reg}$) to start the forward conduction, the likelihood of mistaking a transient noise at node 220 as a positive voltage supplied by battery 102, and falsely enabling transistor 202 as a result, can be reduced. The target forward voltage $V_{F-reg}$ can be regulated at a lower voltage than $V_{F-on}$ to reduce voltage drop and power loss across transistor 202 when emulating the forward-biased diode.

Also, controller circuit 200 can compare $V_{AC}$ with a reverse bias threshold voltage $V_R$, in step 246, to detect a reverse battery connection. The reverse bias threshold voltage $V_R$ can be a negative voltage that can be received from the negative terminal of battery 102 when the polarity of battery 102 is reversed. Therefore, comparing $V_{AC}$ against a negative voltage to detect a reverse battery connection can reduce the likelihood of false detection of reverse battery connection, such as caused by a transient voltage at node 220. If $V_{AC}$ is below $V_R$, which can indicate a reverse battery connection, or if $V_{AC}$ is above $V_R$ but below $V_{F-on}$, which can indicate a small transient voltage rather than a large positive voltage supplied by battery 102, controller circuit 200 can maintain transistor 202 in a disabled state, in step 247. In a case where transistor 202 is disabled and the conduction channel is removed, the reverse-biased body diode 210 can block a negative voltage/a reverse current.

Figure 2C:
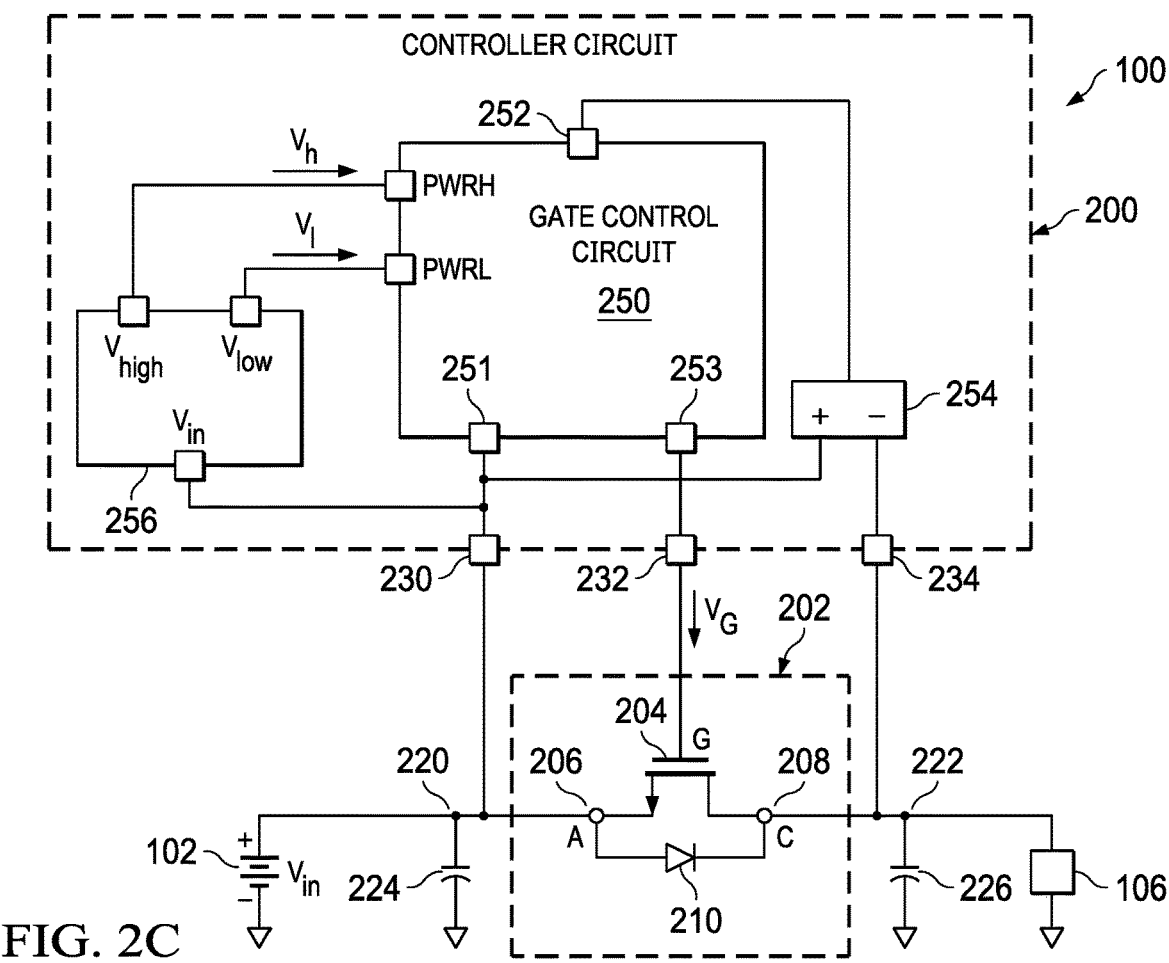

FIG. 2C illustrates examples of internal components of controller circuit 200. Referring to FIG. 2B, controller circuit 200 can include a gate control circuit 250. Gate control circuit 250 can include an input 251, an input 252, and an output 253. Input 251 can be adapted to be coupled to first current terminal 206 of transistor 202, which can be the anode of the diode to be emulated, via terminal 230. Output 253 can be adapted to be coupled to gate 204 via terminal 232. Controller circuit 200 further includes a voltage subtractor circuit 254, which can include an op-amp subtractor or other suitable circuits, to receive an anode voltage $V_A$ via terminal 230 and a cathode voltage $V_C$ via terminal 234, generate an anode-cathode voltage $V_{AC}$ representing a difference between $V_A$ and $V_C$, and provide $V_{AC}$ to input 252 of gate control circuit 250. Gate control circuit 250 can generate a gate voltage signal $V_G$ in response to $V_{AC}$, based on the techniques described in method 240 of FIG. 2B, and provide gate voltage signal $V_G$ via output 253 and terminal 232 to enable transistor 202 to conduct a forward current from the anode to the cathode (and from battery 102 to load 106), or to disable transistor 202 to block the flow of a reverse current from the cathode back to the anode (and from load 106 back to battery 102).

Also, controller circuit 200 can include a local voltage generator circuit 256 to generate local voltages. Local voltage generator circuit 256 can receive the anode voltage, which can be a positive voltage provided by battery 102, via terminal 230 as an input ($V_{in}$). Local voltage generator circuit 256 can provide a high supply voltage ($V_h$) to a high power supply terminal (labelled "PWRH" in FIG. 2C) of gate control circuit 250, and a low supply voltage ($V_l$) to a low power supply terminal (labelled "PWRL" in FIG. 2C) of gate control circuit 250. The high supply voltage and the low supply voltage can be generated from the anode voltage $V_A$ and supplied to gate control circuit 250 to reduce the drain-source voltages ($V_{DS}$) of devices of gate control circuit 250 and the resulting voltage stress. Local voltage generator circuit 256 can include a charge pump to generate the high supply voltage $V_h$ by adding an offset voltage to the anode voltage $V_A$. Local voltage generator circuit 256 can also include a linear regulator, such as a floating-rail low drop out (LDO) regulator, to generate the low supply voltage $V_l$ by subtracting an offset voltage from the anode voltage $V_A$.

Figure 2D:
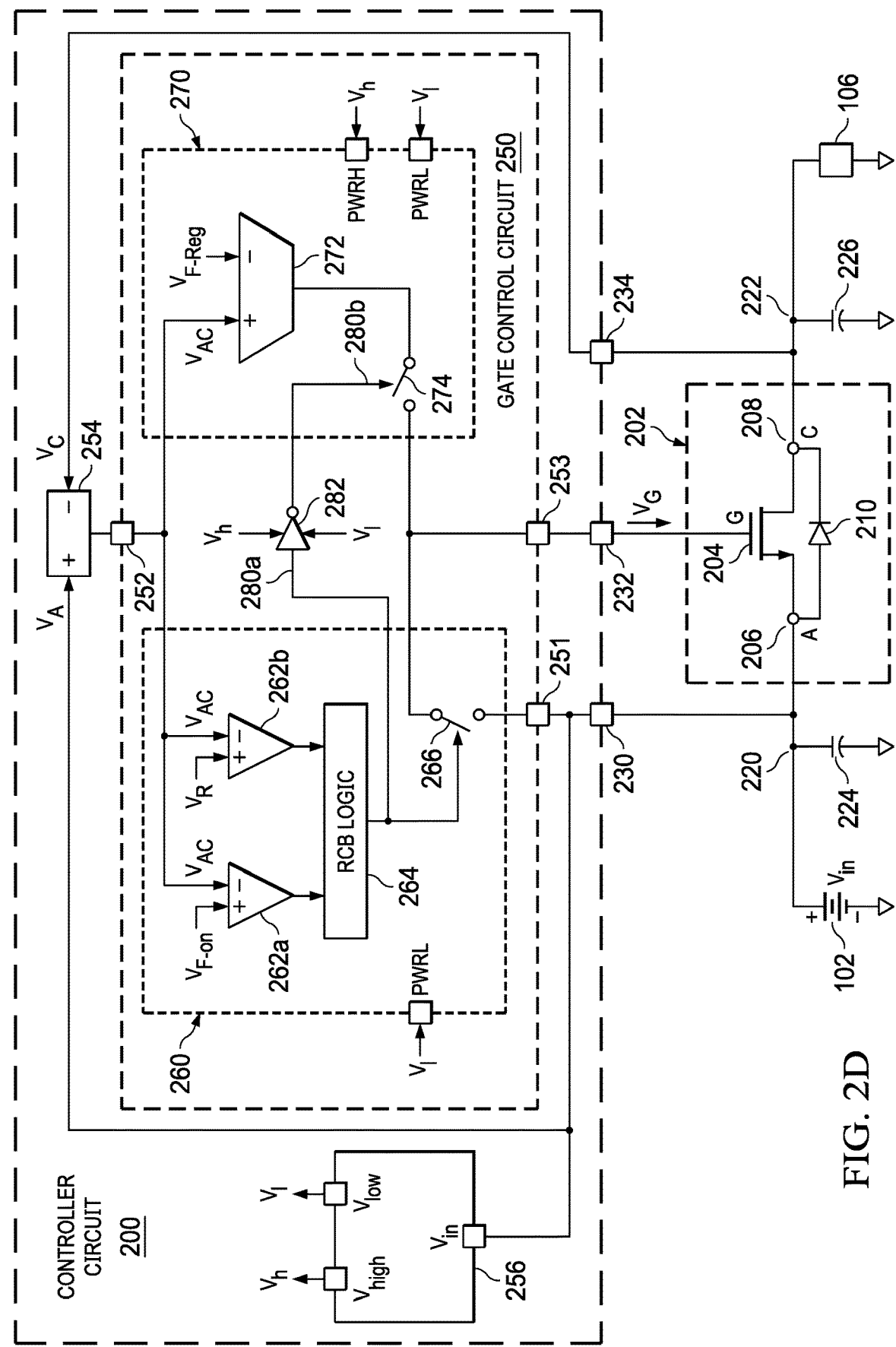

FIG. 2D illustrates examples of internal components of gate control circuit 250. Referring to FIG. 2D, gate control circuit 250 can include a reverse current blocking (RCB) circuit 260, which can include a network of comparators including comparators 262a and 262b, an RCB logic circuit 264, and a switch 266. Switch 266 is coupled between input 251 (which can be coupled to first current terminal 206/anode of transistor 202) and output 253 (which can be coupled to gate 204). Gate control circuit 250 can also include a forward conduction control circuit 270, which can include an amplifier 272, such as an operational transconductance amplifier (OTA), an op-amp, etc., and a switch 274. Switch 274 can be coupled between the output of amplifier 272 and output 253. In some examples, switch 274 can be part of a switchable output stage of amplifier 272. RCB logic 264 can control switches 266 and 274 via a pair of complimentary control signals 280a and 280b. Accordingly, when switch 266 is closed, switch 274 can be opened, and vice versa. Gate control circuit 250 can include an inverter 282 to generate control signal 280b from control signal 280a.

RCB circuit 260 and forward conduction control circuit 270, through switches 266 and 274, can set the gate-source voltage $V_{GS}$ of transistor 202 in response to the anode-cathode voltage $V_{AC}$, to enable the flow of a forward current from the anode to the cathode (and from battery 102 to load 106), and to block the flow of a reverse current from the cathode back to the anode (and from load 106 back to battery 102), based on techniques described in FIG. 2B.

Figure 2E:
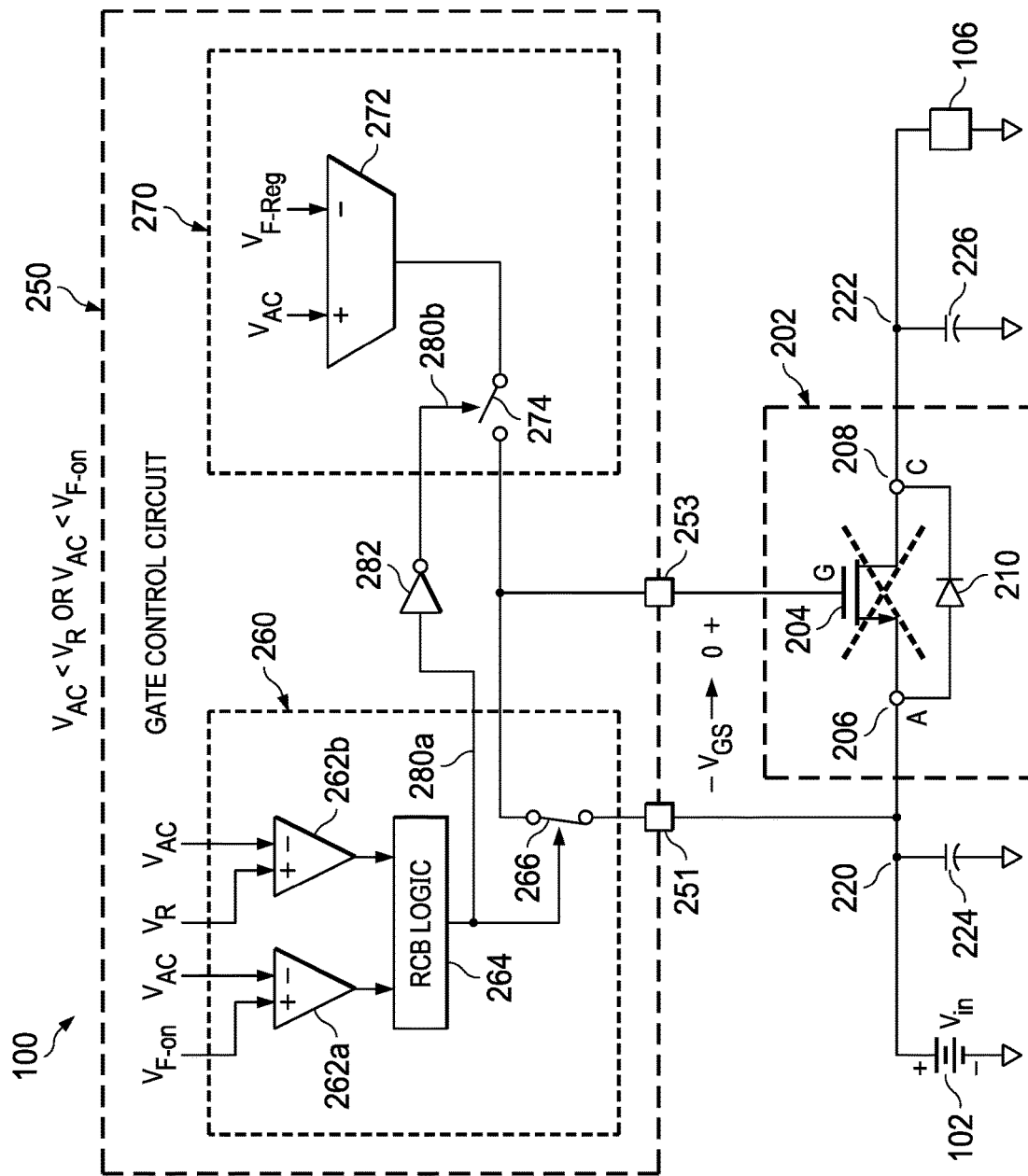

Specifically, referring to FIG. 2E, each of comparators 262a and 262b can receive $V_{AC}$ from voltage subtractor circuit 254. Comparator 262a can compare $V_{AC}$ against forward conduction threshold voltage $V_{F-on}$ to generate a first decision, and comparator 262b can compare $V_{AC}$ against reverse bias threshold voltage $V_R$ to generate a second decision. If $V_{AC}$ is below $V_{F-on}$ (which can indicate $V_{AC}$ is raised by a small transient voltage), or if $V_{AC}$ is below $V_R$ (which can indicate a reverse battery connection), RCB logic 264 can provide a control signal 282a to disable transistor 202. Controller circuit 200 can generate control signal 280a to close switch 266 to connect first current terminal 206 with gate 204. By connecting first current terminal 206 with gate 204, the gate voltage $V_G$ can be set to be equal to the source voltage Vs, and the gate-source voltage ($V_{GS}$) for transistor 202 can be reduced to zero. With the $V_{GS}$ voltage below a threshold voltage $V_{th}$ for forming a channel below gate 204, transistor 202 can be disabled, and the flow of current between first current terminal 206 and second current terminal 208 of transistor 202 can also be disabled. Moreover, inverter 282 can generate control signal 280b as a complimentary version of control signal 280a to open switch 274, and the output of amplifier 272 can be disconnected from output 253 (and terminal 232) to avoid interfering with the setting of the gate-source voltage ($V_{GS}$) for transistor 202 by RCB circuit 260.

In some examples, RCB logic circuit 264 can include a timing circuit, such as a timer. RCB logic circuit 264 can start the timer after disabling switch 266. The timer can define an RCB timing window in which transistor 202 is to be continuously disabled regardless of whether $V_{AC}$ is below or above the forward conduction threshold voltage $V_{F\text{-}on}$, and switch 266 is to be continuously enabled. Within the RCB timing window, RCB logic circuit 264 can ignore decisions from comparators 262a and 262b to continue closing switch 266 to disable transistor 202, and continue opening switch 274 to disconnect the output of amplifier 272 from gate 204. Such arrangements can reduce the likelihood of controller circuit 200 falsely starting a forward conduction due to transient signals at the anode/cathode. The duration of the RCB timing window can be fixed (e.g., built into RCB logic circuit 264) or can be programmable via a register coupled to RCB logic circuit 264 (not shown in the figures).

Figure 2F:
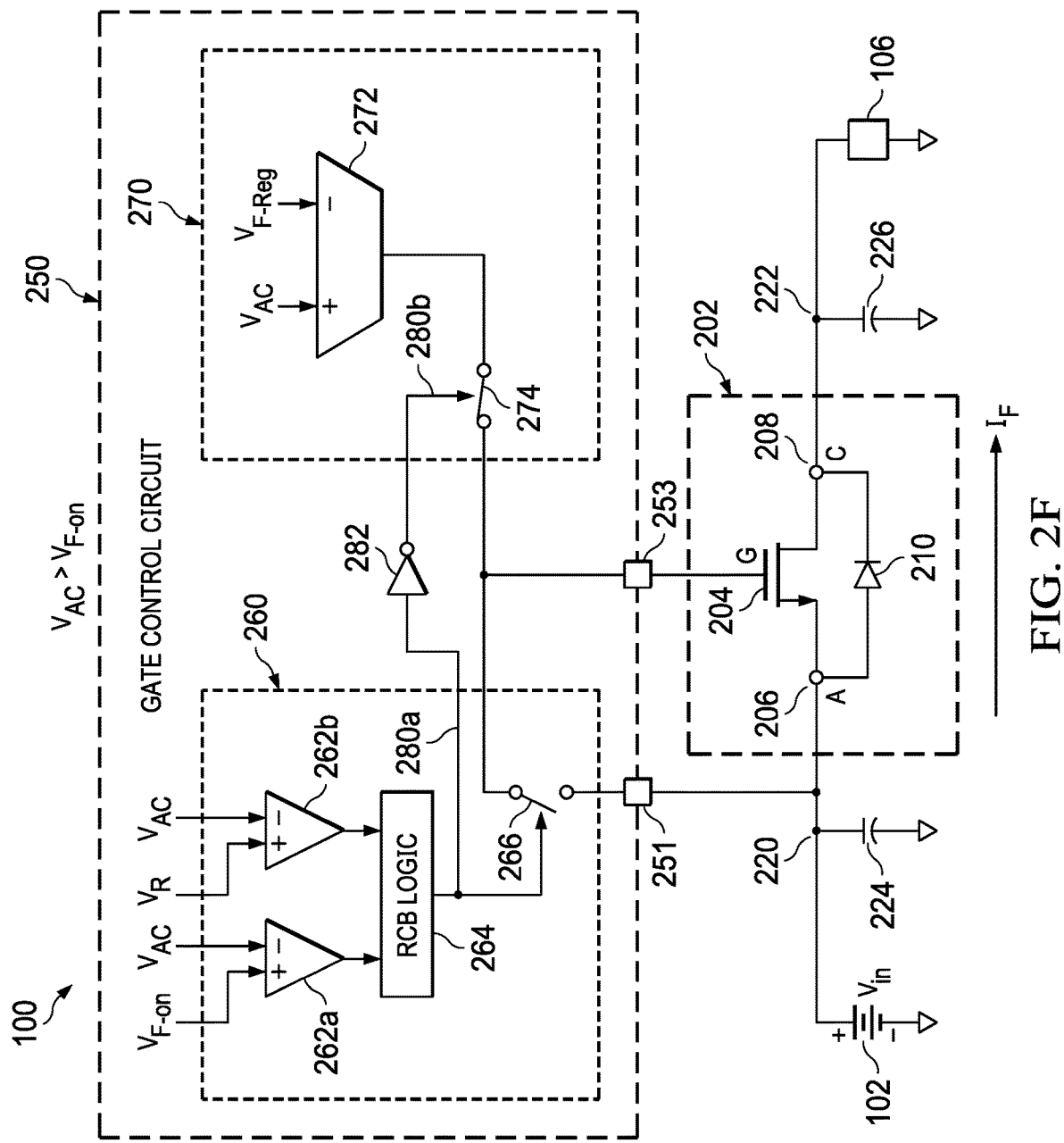

FIG. 2F illustrates examples of operations of gate control circuit 250 to enable forward conduction. Referring to FIG. 2F, if the decisions of comparators 262a and 262b indicate that $V_{AC}$ is higher than $V_{F\text{-}on}$, which can indicate that the battery is connected in the correct polarities (e.g., positive terminal being coupled to the anode of transistor 202), RCB logic 264 can generate control signal 280a to open switch 266, while control signal 280b, being a complimentary version of control signal 280b, can close switch 274 to connect the output of amplifier 272 with output 253 (and gate 204 via terminal 232). Amplifier 272 is then allowed to adjust the gate voltage $V_G$ (or decrease the gate voltage $V_G$ if transistor 202 is PFET) via output 253 and terminal 232. With the anode voltage $V_A$ largely fixed by battery 102, if the gate-source voltage $V_{GS}$ (or $V_{SG}$ if transistor 202 is PFET) becomes higher than the threshold voltage $V_{th}$ of transistor 202, a conduction channel can be created between first current terminal 206 and second current terminal 208 of transistor 202. The conduction channel can then enable the flow of forward current $I_F$ from first current terminal 206 to second current terminal 208 of transistor 202 (and from battery 102 to load 106).

Also, amplifier 272 can implement a feedback loop to set the gate voltage of transistor 202 to regulate the voltage $V_{AC}$ across transistor 202 at a value equal to $V_{F\text{-}reg}$ across different forward currents $I_F$, to emulate a forward-biased diode as shown in FIG. 2A. Amplifier 272 can generate an output (e.g., a current, a voltage, etc.) that is linearly related to a difference between the anode-cathode voltage $V_{AC}$ and a target forward voltage $V_{F\text{-}reg}$ to adjust the on-resistance of the conduction channel of transistor 202. The current provided by amplifier 272 can be converted to a voltage to set the gate voltage of transistor 202, which in turn can set the on-resistance of transistor 202. The on-resistance of transistor 202 can be adjusted, so the voltage $V_{AC}$ across transistor 202 (which can be equal to a product between the on-resistance and the forward current) is maintained at the target forward voltage $V_{F\text{-}reg}$. For example, if load 106 sinks more current, the voltage $V_{AC}$ across transistor 202 can become larger than $V_F$. In response, amplifier 272 can increase the gate-source voltage $V_{GS}$ of transistor 202 (or the source-gate voltage $V_{SG}$ if transistor 202 is PFET) to reduce the on-resistance of transistor 202, to reduce the voltage $V_{AC}$ back to $V_{F\text{-}reg}$. However, if load 106 sinks less current, the voltage $V_{AC}$ can decrease. In response, amplifier 272 can reduce the gate-source voltage $V_{GS}$ of transistor 202 (or $V_{SG}$ if transistor 202 is PFET) to increase its on-resistance, to increase the voltage $V_{AC}$ back to $V_{F\text{-}reg}$.

With such arrangements, a voltage $V_{AC}$ across transistor 202 can be maintained to emulate a forward-biased diode. The voltage provided by transistor 202 to load 106 can be maintained constant (or within a narrow range) and can be independent of forward current $I_F$. This also allows the internal power supply (e.g., internal power supply 108) of load 106 to provide a stable supply voltage. Moreover, $V_{AC}$ can be maintained at a low value to reduce power loss incurred by transistor 202, especially when transistor 202 conducts a huge forward current $I_F$ to load 106.

Referring again to FIG. 2D, RCB circuit 260 can receive low supply voltage $V_l$ from local voltage generator circuit 256, and forward conduction circuit 270 and inverter 282 can receive both low supply voltage $V_l$ and high supply voltage $V_h$ from local voltage generator circuit 256. Specifically, RCB circuit 260 can operate within a voltage range below the anode voltage $V_A$ to either disable transistor 202 by shorting the gate and source of transistor 202, or releasing the gate of transistor 202, therefore RCB circuit 260 can operate on low supply voltage $V_l$ to reduce voltage stress and to improve reliability of the internal devices of RCB circuit 260. Moreover, forward conduction control circuit 270 and inverter 282 can operate within a voltage range above the anode voltage $V_A$. Such arrangements can increase gate overdrive voltage to enable transistor 202 while limiting the gate-drain voltage ($V_{GD}$) and gate-source voltage ($V_{GS}$) to reduce voltage stress across transistor 202, which can improve the reliability of transistor 202. Also, by operating forward conduction control circuit 270 and inverter 282 between the high supply voltage and the low supply voltage, the voltage swing in the devices of forward control circuit 270 and inverter 282 can be reduced, which can also reduce voltage stress and improve reliability of the internal devices of forward control circuit 270 and inverter 282.

While controller circuit 200 and transistor 202 of FIGS. 2A through 2F can protect load 106 from a reverse battery connection, issues may arise in a battery loss event. A battery loss event can occur, such as when battery 102 is disconnected from the anode of transistor 202, or battery 102 no longer supplies charge to the anode, etc., so the anode becomes floating and not driven by the battery. In such a battery loss event, controller circuit 200 of FIGS. 2A through 2F may cause transistor 202 to transition between an enabled state and a disabled state repeatedly due to charge coupling between the gate and the anode of the transistor, and cannot properly disable the transistor as a result.

Figure 3A:
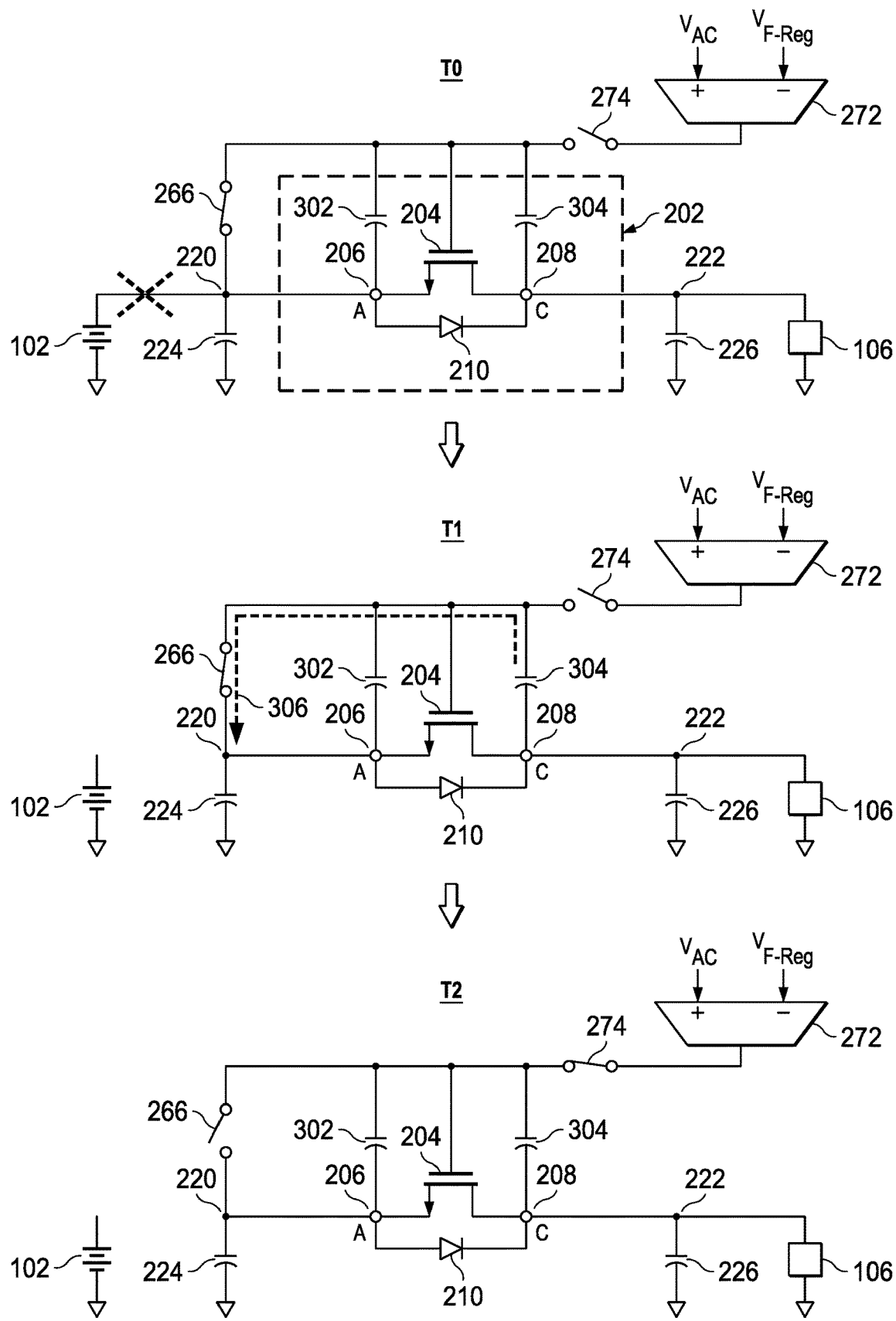
FIGS. 3A, 3B and 3C illustrate examples of operations performed by the protection system of FIGS. 2A through 2F in a battery loss event.
Figure 3B:
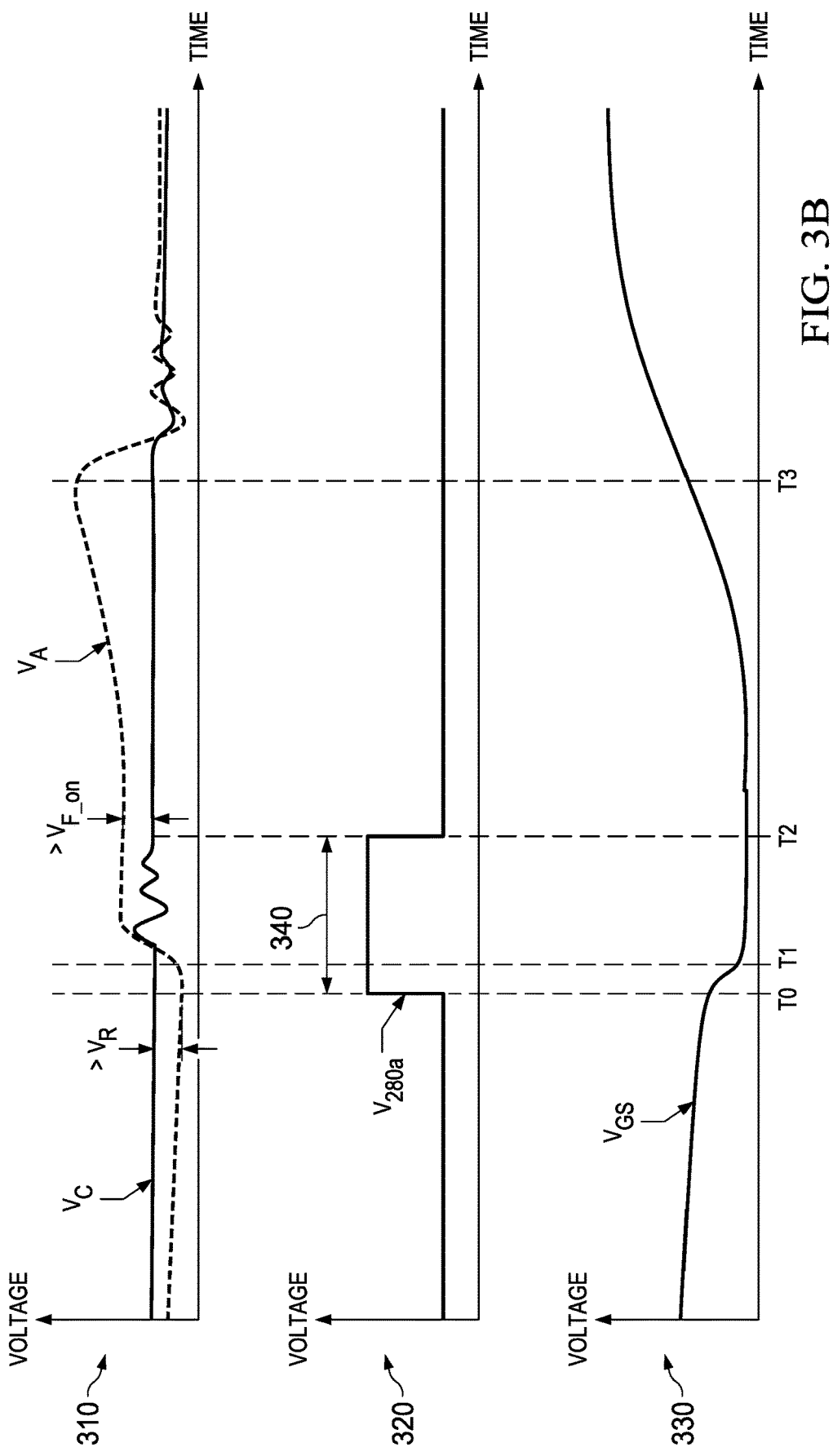
Figure 3C:
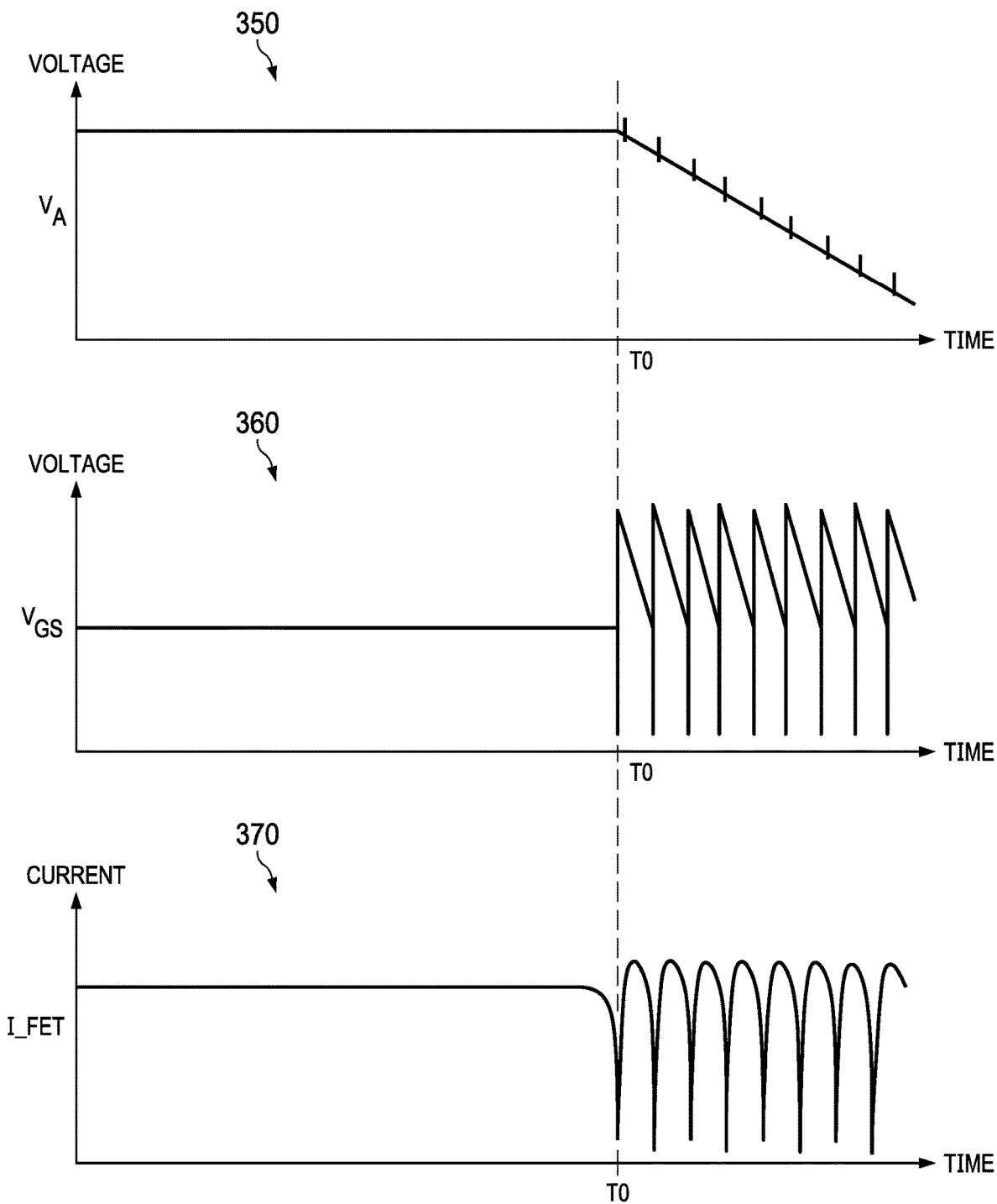

FIG. 3A illustrates examples of operations of controller circuit 200 and transistor 202 in a battery loss event, while FIG. 3B and FIG. 3C illustrate examples of voltage and current graphs of controller circuit 200 and transistor 202 in a battery loss event. The description is based on transistor 202 being an NFET for brevity, but can also apply to a case where transistor 202 is a PFET. As shown in FIG. 3A, transistor 202 can include a parasitic capacitance 302 between gate 204 and first current terminal 206, which can be gate-source capacitance $C_{GS}$. Transistor 202 can also include a parasitic capacitance 304 between gate 204 and second current terminal 208, which can be gate-drain capacitance $C_{GD}$. Parasitic capacitance 302 can store a charge that reflects the gate-source voltage $V_{GS}$, and parasitic capacitance 204 can store a charge that reflects the gate-drain voltage $V_{GD}$. FIG. 3B illustrates a voltage graph 310 of anode voltage $V_A$ and cathode voltage $V_C$, a voltage graph 320 of control signal 265 provided by RCB logic circuit 264, and a voltage graph 330 of gate-source voltage ($V_{GS}$) of transistor 202.

Referring to FIG. 3A and FIG. 3B, between times T0 and T1, a battery loss event occurs where battery 102 is disconnected from node 220, which is coupled to capacitor 224, switch 266, and first current terminal 206 of transistor 202 that forms the anode. As a result, node 220 (and the anode of the diode) is no longer driven by battery 102, and the anode-cathode voltage $V_{AC}$ may become lower than the forward voltage $V_R$, which can be detected by comparator 262b. Referring to graph 310 of FIG. 3A, this can be represented by $V_A$ being below $V_C$ by more than $V_R$ at time T0. Referring to graph 330, RCB circuit 260 can enable switch 266 to electrically short gate 204 with first current terminal 206 to bring gate-source voltage ($V_{GS}$) to near zero at time T1, thereby disabling transistor 202. Moreover, referring to graph 320, the enabling of switch 266 can also start a RCB timing window 340 at time T0.

The change of the gate-source voltage $V_{GS}$ can cause charge previously stored in parasitic capacitance 304 ($C_{GD}$) of transistor 202, represented by charge 306 in FIG. 3A, to flow from gate 304 via switch 266 into node 220/first current terminal 206 of transistor 202 at time T1. As the anode is not being driven by battery 102, the injection of the charge can cause the anode voltage $V_A$ to go up. The resulting anode voltage $V_A$ can be based on the gate-drain voltage $V_{GD}$ prior to switch 266 being switched off, and a ratio between parasitic capacitance 304 ($C_{GD}$) and the parasitic capacitance at node 220 (and the anode of the diode) represented by capacitor 224, as follows:

$$V_A = \frac{C_{GD} \times V_{GD}}{C_{224}} \quad \text{(Equation 1)}$$

In Equation 1, the product $C_{GD} \times V_{GD}$ can represent a quantity of charge being injected into capacitor 224, and $C_{224}$ can represent the capacitance of capacitor 224. As shown in graph 310 of FIG. 3B, due to the charge injection, the anode voltage $V_A$ can rise above $V_C + V_{F\text{-}on}$, which causes the anode-cathode voltage $V_{AC}$ to become higher than forward conduction threshold voltage $V_{F\text{-}on}$ as well.

Between times T1-T2, as the gate-source voltage $V_{GS}$ settles at a low value (e.g., zero) and transistor 202 is disabled, the charge injection stops, but the anode-cathode voltage $V_{AC}$ settles at a value above $V_{F\text{-}on}$. Since the duration between times T1-T2 is still within RCB timing window 340, RCB circuit 260 can continue to disable transistor 202 (by closing switch 266) and disregard the output of comparator 262a indicating that $V_{AC}$ is higher than $V_{F\text{-}on}$. Switch 266 can continue to be closed and switch 274 can continue to be opened, which can prevent forward conduction control circuit 270 from increasing the gate voltage of transistor 202.

RCB timing window 340 expires at time T2. Between times T2-T3, RCB circuit 260 determines that the anode-cathode voltage $V_{AC}$ exceeds $V_{F\text{-}on}$, and de-assert control signal 280a to open switch 266 and to close switch 274. RCB circuit 260 may mistake the rise of $V_{AC}$ due to the charge injection in the battery loss event as indicating that battery 102 is connected with the proper polarities, and start the forward conduction of transistor 202 as a result. Amplifier 272 is allowed to raise the gate voltage of transistor 202 based on a difference between $V_{AC}$ and $V_{F\text{-}reg}$. The change in the gate voltage of transistor 202 can also inject charge into first current terminal 206 and the anode via parasitic capacitance 302 ($C_{GS}$), which can further increase the anode voltage $V_A$.

Referring to graph 330, at time T3, the $V_{GS}$ voltage of transistor 202 can become high enough to enable transistor 202 and create a conduction channel between first current terminal 206 and second current terminal 208 and under gate 204. Via the conduction channel, the anode can be discharged, and the anode voltage $V_A$ drops. If the anode-cathode voltage $V_{AC}$ falls below the reverse bias threshold voltage $V_R$ or the forward conduction threshold $V_{F\text{-}on}$, RCB circuit 260 can reduce the gate voltage to disable transistor 202 again, and the change in the gate voltage can again inject charge into the anode and increase the anode voltage $V_A$. The charging and discharging of the anode can repeat, which causes transistor 202 to transition between the enabled state and the disabled state repeatedly. The repeated transitions can continue until all the electric energy previously stored in capacitor 226 on the load side is dissipated in transistor 202 as power loss when the transistor conducts current from first current terminal 206 to second current terminal 208.

FIG. 3C illustrates additional examples of voltages and currents of transistor 202 in a battery loss event when controlled by controller circuit 200. FIG. 3C illustrates a graph 350 of the anode voltage $V_A$, a graph 360 of the gate-source voltage ($V_{GS}$) of transistor 202, and a graph 370 of a current (labelled "I_FET") that flows from first current terminal 206 to second current terminal 208 of transistor 202 (and load 106). As shown in graph 350, starting from time T0, the anode voltage $V_G$ drops as it is not driven by battery 102, but spikes occur repeatedly due to repeated injection of charge from $C_{GD}$. Moreover, as shown in graph 360, gate-source voltage $V_{GS}$ repeatedly fluctuates between a zero value and a non-zero value, which causes transistor 202 to transition between the enabled state and the disabled state repeatedly. Further, as shown in graph 370, within each cycle in which $V_{GS}$ is non-zero and transistor 202 is enabled, a negative I_FET current can flow away from load 106 when $V_{AC}$ is below $V_R$ initially, which triggers RCB circuit 260 to disable transistor 202. But then as $V_{GS}$ increases to start forward conduction by transistor 202, a positive I_FET current flows to load 106 from the anode, which causes $V_A$ to drop. After $V_{AC}$ drops below $V_{F\_on}$, transistor 202 is disabled, bringing $V_{GS}$ and the I_FET current to zero towards the end of a cycle.

The repeated enabling and disabling of the transistor in a battery loss event is undesirable, because it can create unexpected and unpredictable operations in the load. Specifically, in a battery loss event, the load is no longer supplied with power from the battery. The electronic systems on the load side, such as subsystems 100, are specified to be disabled, so they do not draw current via the transistor. However, repeatedly enabling and disabling of the transistor in a battery loss event may allow the electronic systems on the load side to draw current and operate intermittently, contrary to the specification.

Moreover, whether the repeated enabling and disabling of a particular transistor in a battery loss event may also become unpredictable. Specifically, as shown in Equation 1, whether the repeated enabling and disabling of the transistor occurs in a battery loss event may depend on the quantity of charge injected into the anode by the gate, which in turn depends on various factors, such as the change in the gate voltage, and the dimensions of the transistor (which can determine $C_{GD}$), the parasitic capacitances at the anode (e.g., capacitor 224), etc. Therefore, power systems having a certain model of transistor as transistor 202 may experience repeated enabling and disabling under some operation conditions, while power systems having other models of transistor as transistor 202 may not experience such repeated enabling and disabling at all. As a result, the power system's handling of a battery loss event can become unpredictable, which in turn can lead to unpredictable operations in the load. While controller circuit 200 can use lowpass filtered anode voltage to reduce false detection of a forward-biased condition, the lowpass filtering can increase the response time of the controller circuit, which can degrade the controller circuit's performance for other applications, such as AC superimposed conditions.

Figure 4A:
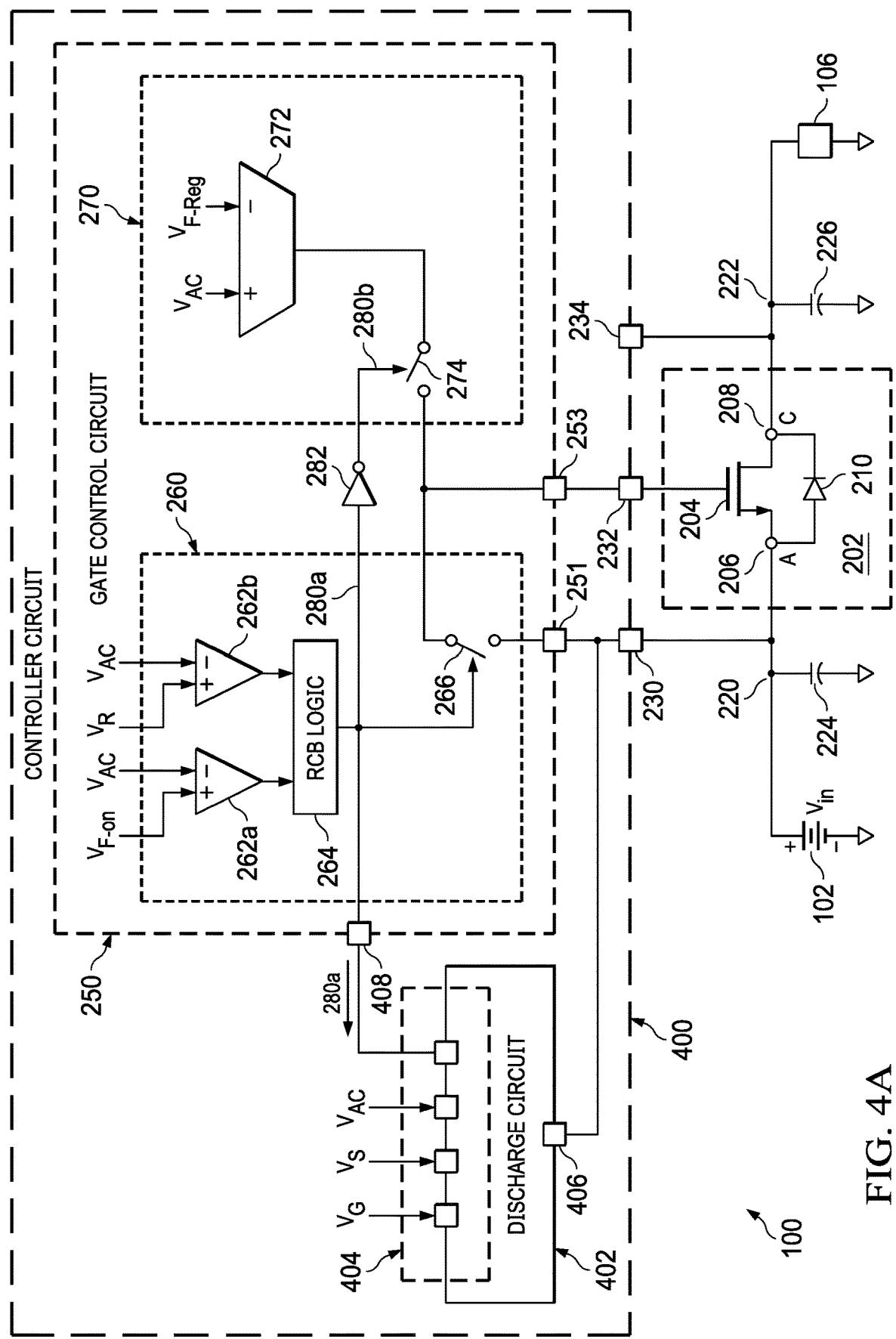
FIGS. 4A through 4D illustrate examples of a protection system including internal components to handle a battery loss event in accordance with various examples.

FIGS. 4A through 4D illustrate examples of a controller circuit 400 that that can address at least some of the issues described above. As shown in FIG. 4A, controller circuit 400 can be coupled to transistor 202, which can be an NFET or a PFET, via terminals 230, 232, and 234. Controller circuit 400 can include gate control circuit 250 (which can include RCB circuit 260 and forward conduction control circuit 270) of controller circuit 200 of FIGS. 2A through 2F. Some of the components of controller circuit 200, such as voltage subtractor circuit 254 and local power supply 256, can be part of controller circuit 400 but are not shown in FIGS. 4A through 4D for brevity.

Also, controller circuit 400 can include a discharge circuit 402 having inputs 404 and an output 406. Discharge circuit 402 may also include a switchable discharge path coupled to output 406, which can be adapted to be coupled to first current terminal 206 of transistor 202. Discharge circuit 402 can receive, via inputs 404, an indication that the gate voltage $V_G$ has been changed (e.g., by RCB circuit 260) to disable transistor 202. Responsive to receiving the indication, discharge circuit 402 can connect the discharge path to output 406 to discharge first current terminal 206. The discharge operation can be configured to, in a battery loss event, remove charge injected (or will be injected) from the $C_{GD}$ parasitic capacitance. Such arrangements can bring down the anode voltage, which can reduce the anode-cathode voltage $V_{AC}$ to below the forward conduction threshold voltage $V_{F-on}$. The reduction of $V_{AC}$ can reduce the likelihood of a false detection of a forward-biased condition, as well as the repeated transition between the enabled state and the disabled state of transistor 202 in a battery loss event, as described in FIG. 3A—FIG. 3C.

Discharge circuit 402 can start the discharge operation responsive to receiving the indication that gate voltage $V_G$ has been changed to disable transistor 202. The indication can come from various sources. In some examples, the indication can be based on a transition of control signal 280a to a state to close switch 266 to bring $V_{GS}$ to zero. The transition of control signal 280a to a state to close switch 266 (or other state to reduce or otherwise bring $V_{GS}$ to zero) can indicate that transistor 202 is disabled. Gate control circuit 250 may include an output 408 that can be coupled directly to input 404 of discharge circuit 402, such as to provide control signal 280a.

In some examples, the indication can be based on the voltages of transistor 202. For example, discharge circuit 402 can receive the anode-cathode voltage $V_{AC}$ from voltage subtractor circuit 254, and compare $V_{AC}$ with a threshold (e.g., a threshold based on $V_{F-on}$) to generate a decision. If $V_{AC}$ is above the threshold, this can indicate that charge is injected from the $C_{GD}$ parasitic capacitance to the anode. As another example, discharge circuit 402 can also monitor gate voltage $V_G$ at terminal 232, and a source voltage Vs (which can be the anode voltage monitored at terminal 230, or the cathode voltage monitored via terminal 234). Discharge circuit 402 can include a voltage subtractor circuit (not shown in the figures) to obtain the gate-source difference voltage $V_{GS}$ (or $V_{SG}$ for a PFET), and determine whether the gate-source voltage $V_{GS}$ (or $V_{SG}$) falls below the threshold voltage $V_{th}$ for forming the conduction channel. If $V_{GS}$ or $V_{SG}$ falls below $V_{th}$, it can also indicate that transistor 202 is disabled. In some examples, discharge circuit 402 can combine control signal 280a, anode-cathode voltage $V_{AC}$, and/or gate-source voltage $V_{GS}$ to determine the indication of whether transistor 202 is disabled to improve accuracy. Responsive to receiving the indication that transistor 202 is disabled, discharge circuit 402 can connect the discharge path to output 406 to discharge first current terminal 206. In these examples, inputs 404 of discharge circuit 402 can be coupled to inputs 251 and 252 and output 253 of gate control circuit 250 to receive $V_{GS}$ and $V_{AC}$.

Figure 4B:
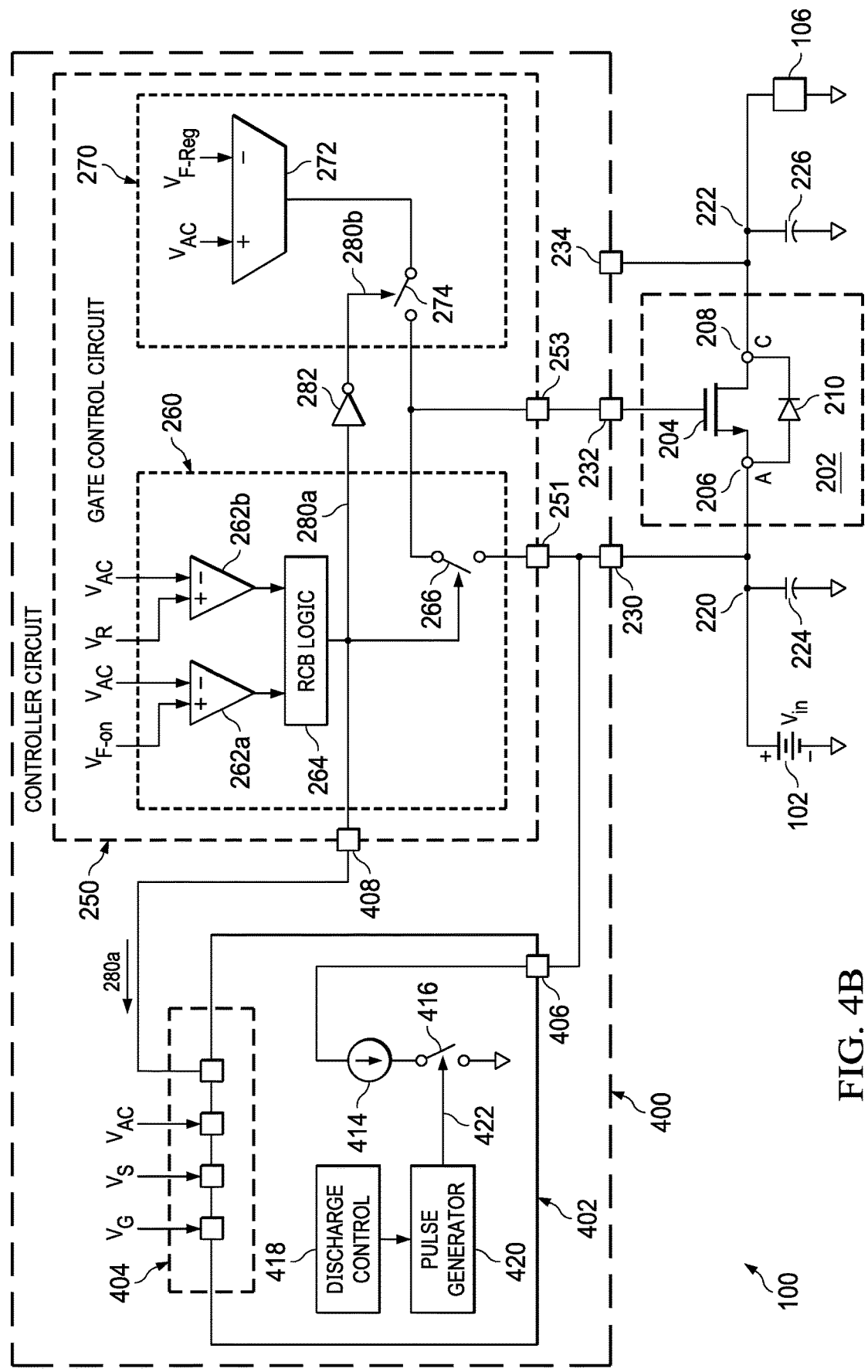
Figure 4C:
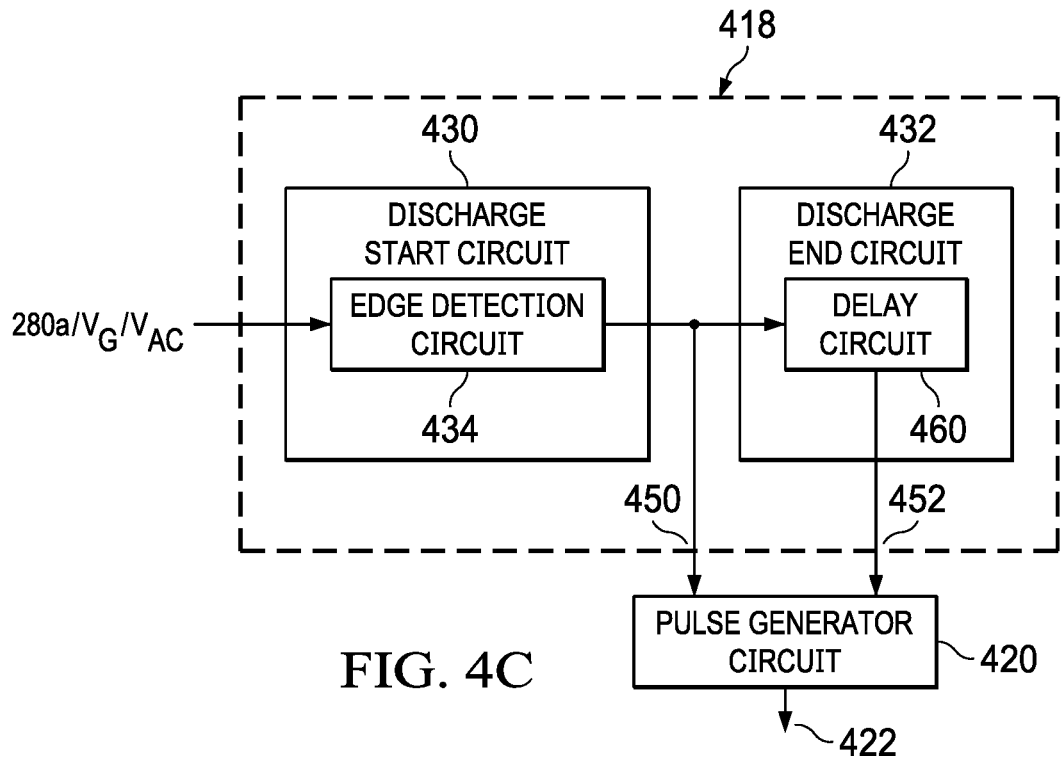
Figure 4D:
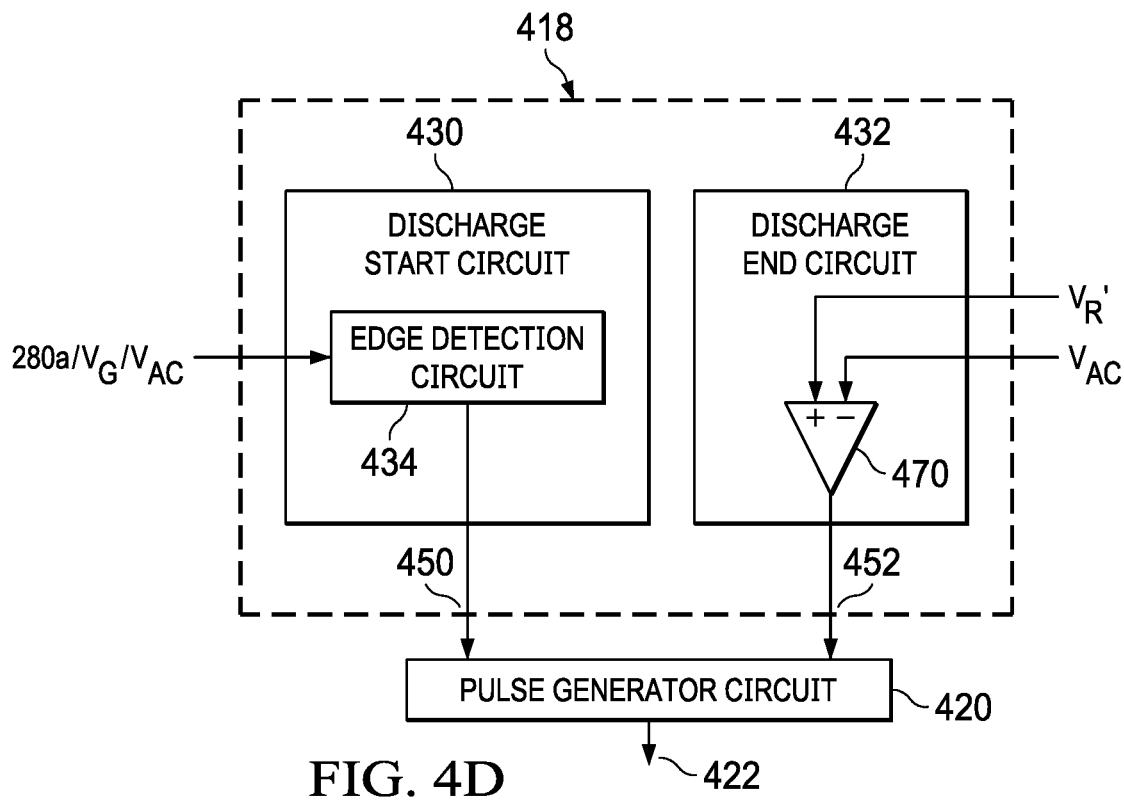

FIGS. 4B through 4D illustrate examples of internal components of discharge circuit 402 and their operations. Referring to FIG. 4B, discharge circuit 402 can include a switchable current/discharge path, which includes a current source 414 and a switch 416, coupled between output 406 and a voltage reference (e.g., a ground) configured as a charge sink. The switchable current path, when enabled with switch 416 closed, can remove charge from first current terminal 206 via output 406 and terminal 230. Discharge circuit 402 can also include a discharge control circuit 418 and a pulse generator 420. Discharge control circuit 418 can determine the start time of the discharge operation based on the timing of the indication that RCB circuit 260 disables transistor 202. Discharge control circuit 418 can also determine the end time of the discharge operation based on various techniques. Discharge control circuit 418 can then provide the start time and end time information to control pulse generator 420 to generate a pulse signal 422 for switch 416. The closing of switch 416 by pulse signal 422 can start the discharge operation, and the opening of switch 416 by pulse signal 422 can end the discharge operation.

Depending on the operation voltage levels, switch 416 can be a PFET, an NFET, or a parallel combination of both. Pulse generator circuit 420 can generate pulse signal 422 as an active low signal (for PFET), or as an active high signal (for NFET). In some examples, pulse generator circuit 420 can generate pulse signal 422 to include both an active low signal and an active high signal as a pair of complimentary signals, in a case where switch 406 includes a parallel combination of an NFET or PFET (e.g., a CMOS switch). The active high and active low voltage levels can be defined by the high supply voltage ($V_h$) and the low supply voltage ($V_l$) supplied by local power supply 256 to pulse generator circuit 420.

FIG. 4C and FIG. 4D illustrate examples of internal components of discharge timing circuit 418. As shown in FIG. 4C and FIG. 4D, discharge control circuit 418 can include a discharge start circuit 430 and a discharge end circuit 432. Discharge start circuit 420 can include an edge detection circuit 434. Comparator 434 can include an analog comparator circuit, a digital edge detection circuit (e.g., an edge-trigged flip-flop circuit), etc., to determine the state of an input signal, which can include control signal 280a, anode-cathode voltage $V_{AC}$, gate voltage $V_G$, etc. Comparator 434 can detect a transition of control signal 280a, or compare a voltage against a threshold (e.g., comparing $V_{AC}$ against $V_{F\text{-}on}$, comparing $V_{GS}/V_{SG}$ against $V_{th}$, etc.) to generate a decision. The transition and the decision can indicate whether transistor 202 is disabled and charge is injected into node 220/first current terminal 206 from parasitic capacitance 304 ($C_{GD}$) of transistor 202. Responsive to the transition/decision, discharge start circuit 430 can generate a discharge start signal 450 based on the timing of the transition/decision, and transmit discharge start signal 450 to pulse generator circuit 420 to control the start of pulse signal 422.

Also, discharge end circuit 432 can generate a discharge end signal 452 and transmit discharge end signal 452 to pulse generator circuit 420 to control the end of pulse signal 422. Discharge end circuit 432 can determine the timing of discharge end signal 452 based on various techniques. Referring to FIG. 4C, in some examples, discharge end circuit 432 can include a delay circuit 460 to generate discharge end signal 452 as a delayed version of discharge start signal 450, with the delay setting a width of pulse signal 412. Delay circuit 440 can include delay elements (e.g., buffers) to delay discharge start signal 450. In some examples, delay circuit 460 can include programmable delay elements, so the delay introduced to discharge start signal 450 in generating discharge end signal 452 is programmable. In such examples, delay circuit 460 can be coupled to a programming register to receive a setting for the delay.

In some examples, the delay introduced by delay circuit 460 which sets the pulse width of pulse signal 422, and the amount of current sunk by current source 414, can be pre-configured to match the total charge injected by parasitic capacitance 304 ($C_{GD}$) of transistor 202, as follows:

$$T_{Discharge} \times I_{Discharge} = C_{GD} \times V_{GD} \qquad \text{(Equation 2)}$$

In Equation 2, $T_{Discharge}$ represents the pulse width of pulse signal 422 set by delay circuit 460, and $I_{Discharge}$ represents the discharge current sunk by current source 414. The total charge injected can be given by the capacitance of parasitic capacitance 304 ($C_{GD}$) of transistor 202, and the gate-drain voltage $V_{GD}$ of transistor 202 prior to transistor 202 being disabled. Delay circuit 460 can be programmed with different delay settings, such as according to the dimension of transistor 202 (which can determine $C_{GD}$), the gate-drain voltage of transistor 202, etc., to remove an amount of charge that commensurate with transistor 202 and the operation condition.

Also, the pulse width $T_{Discharge}$ can be determined based on other information, such as the expiration time of RCB timing window 340. As described above, in a case where RCB circuit 260 continues to disable transistor 202 within the RCB timing window, the discharge operation can end before the RCB timing window expires, to prevent a false detection of a forward-biased condition by RCB circuit 260. Accordingly, the pulse width $T_{Discharge}$, and the start time of pulse signal 422 and the discharge current $I_{Discharge}$, can be configured according to the expiration time of RCB timing window 340, to ensure that a target amount of the injected charge can be removed before RCB timing window 340 expires.

FIG. 4D illustrates additional examples of discharge end circuit 432. Specifically, discharge end circuit 432 can generate discharge end signal 452 based on monitoring a change in the anode-cathode voltage $V_{AC}$, which can drop due to the discharge operation. If $V_{AC}$ falls below another threshold, discharge end circuit 432 can determine that the charge injected by the capacitance of parasitic capacitance 304 ($C_{GD}$) of transistor 202 has been removed, and the discharge operation can stop. In some examples, threshold $V_R'$ can be equal to reverse bias threshold voltage $V_R$, or can be set lower than $V_R$ to provide a noise margin. Referring to FIG. 4D, discharge end circuit 432 can include a comparator 470 to compare $V_{AC}$ against threshold $V_R'$ to generate a decision, and discharge end circuit 432 can generate discharge end signal 452 in response to the decision, and provide discharge end signal 452 to pulse generator circuit 420. In some examples, comparator 470 can also compare the anode voltage $V_A$ against the cathode voltage $V_C$ generate discharge end signal 452.

The examples of controller circuit 400 of FIGS. 4A through 4D can also handle reverse battery connection. Specifically, in a reverse battery connection, the anode voltage is largely set by the negative terminal of the battery, and the anode-cathode voltage $V_{AC}$ can remain below the reverse threshold voltage $V_R$ with or without the discharge of the anode by the discharge circuit. In such a case, a false detection of a forward-biased condition also may not occur, and the discharge circuit is unlikely to interfere with the operation of RCB circuit 260 in disabling transistor 202.

Figure 5A:
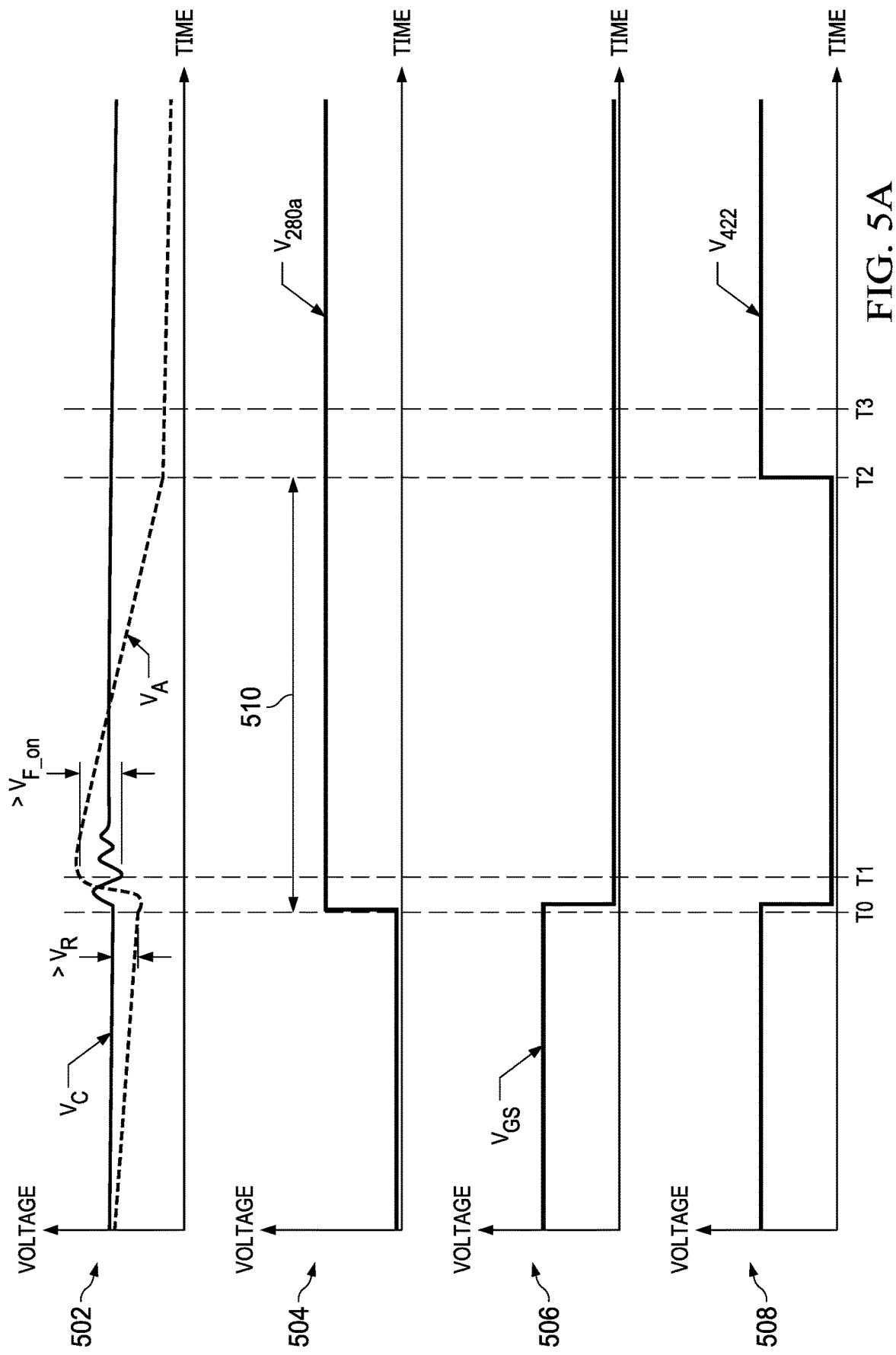
FIG. 5A and FIG. 5B illustrate examples of voltage and current graphs depicting the operations of the protection system of FIGS. 4A through 4D in a battery loss event.
Figure 5B:
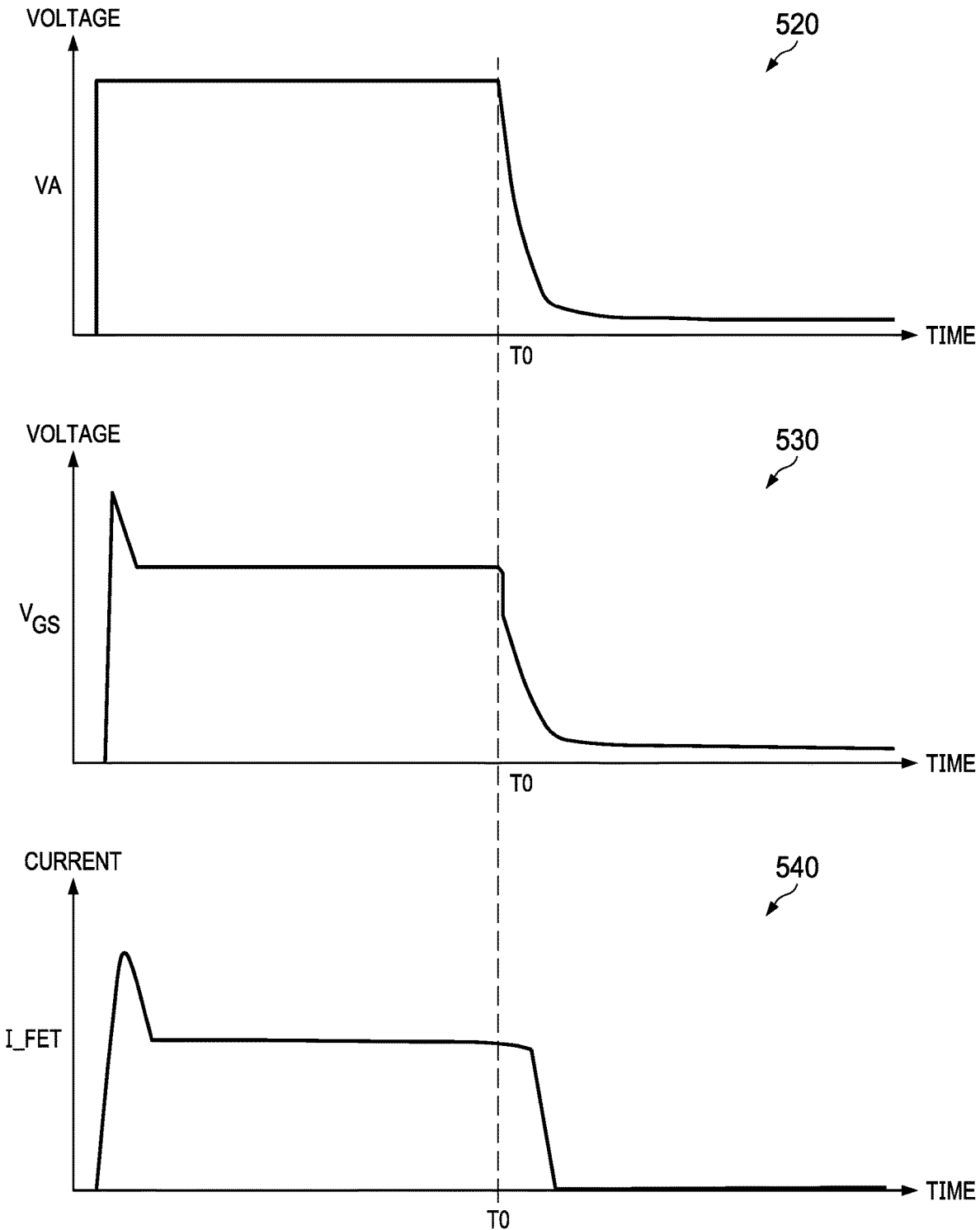

FIG. 5A and FIG. 5B illustrate examples of voltage and current graphs of controller circuit 400 and transistor 202 in a battery loss event. FIG. 5A illustrates a voltage graph 502 of anode voltage $V_A$ and cathode voltage $V_C$, a voltage graph 504 of control signal 280a provided by RCB logic circuit 264, a voltage graph 506 of gate-source voltage ($V_{GS}$) of transistor 202, and a voltage graph 508 of pulse signal 422 generated by pulse generation circuit 410.

Referring to FIG. 5A, between times T0-T1, a battery loss event occurs where battery 102 is disconnected from node 220. As shown in graph 502, node 220 (and the anode of the diode) is no longer driven by battery 102, and the anode-cathode voltage $V_{AC}$ may become lower than the reverse bias threshold voltage $V_R$. RCB circuit 260 may change the state of control signal 280a to close switch 266, which can then electrically short gate 204 with first current terminal 206 to bring gate-source voltage ($V_{GS}$) to zero to disable transistor 202. The change of the gate-source voltage $V_{GS}$ can cause charge previously stored in parasitic capacitance 304 ($C_{GD}$) of transistor 202 to be injected into node 220/first current terminal 206 of transistor 202, which causes the anode voltage $V_A$ to go up above the forward voltage threshold at time T1.

Meanwhile, the enabling of switch 266 can also start an RCB timing window 510 at time T0, as shown in graph 506. Further, the transition of control signal 265 can be detected by discharge start circuit 420 to trigger the start of pulse signal 412 to discharge node 220/first current terminal 206, as shown in graph 508

Between times T1-T2, discharge circuit 402 can discharge node 220/first current terminal 206 to bring down the anode voltage $V_A$, as shown in graph 504. The timing of the discharge operation can be based on pulse 422. The start of the discharge operation (and pulse 422) by discharge circuit 402 can be triggered by various sources, such as by the transition of control signal 280a to a state to close switch 266 at time T0, the falling of gate-source voltage $V_{GS}$ of transistor 202 to below the threshold voltage $V_{th}$ between times T0-T1, the rise of anode-cathode voltage $V_{AC}$ to above $V_{F\_on}$ at time T1, etc. The duration between times T1-T2 can also be within RCB timing window 510, where RCB circuit 260 continues to disable transistor 202, switch 266 continues to be enabled and switch 274 continues to be disabled. At time T2, the anode voltage $V_A$ is well below the cathode voltage $V_C$.

Referring to graph 508, pulse signal 422 stops at time T2, which also stops the discharge operation. Anode voltage $V_A$ settles at a voltage well below the cathode voltage $V_C$, and the anode-cathode voltage $V_{AC}$ is well below $V_{F\text{-}on}$, as shown in graph 502. RCB timing window 510 expires at or after time T2, as shown in graph 506. Between times T2 and T3, RCB circuit 260 can obtain the latest anode voltage $V_A$ and the latest cathode voltage $V_C$ and determine that the latest anode-cathode voltage $V_{AC}$ remains below the forward voltage $V_{F\text{-}on}$. RCB circuit 260 can continue closing switch 266 to keep gate-source voltage $V_{GS}$ of transistor 202 at zero to maintain transistor 202 in the disabled state. This is also reflected in graph 506 where $V_{GS}$ settles to and remains at a low value near zero to disable transistor 202 after time T0.

FIG. 5B illustrates additional examples of voltage and current graphs of transistor 202 in a battery loss event when controlled by controller circuit 400. FIG. 5B illustrates a graph 520 of the anode voltage $V_A$, a graph 530 of the gate-source voltage $V_{GS}$ of transistor 202, and a graph 540 of a current (labelled "I_FET") that flows from first current terminal 206 to second current terminal 208 of transistor 202 (and load 106). As shown in graph 520, starting from time T0, anode voltage $V_G$ drops as it is no longer driven by battery 102 while being discharged by discharge circuit 402. Accordingly, the repeated pattern of spikes at the anode voltage $V_A$ caused by the repeated injection of charge from $C_{GD}$ can be eliminated or at least reduced. Moreover, as shown in graph 530, $V_{GS}$ also drops to a low value near zero after time T0. Further, as shown in graph 540, as transistor 202 is disabled after time T0, current that flows to load 106 drops to zero after time T0, which allows the circuits in load 106 to be completely turned off/disabled.

Figure 6:
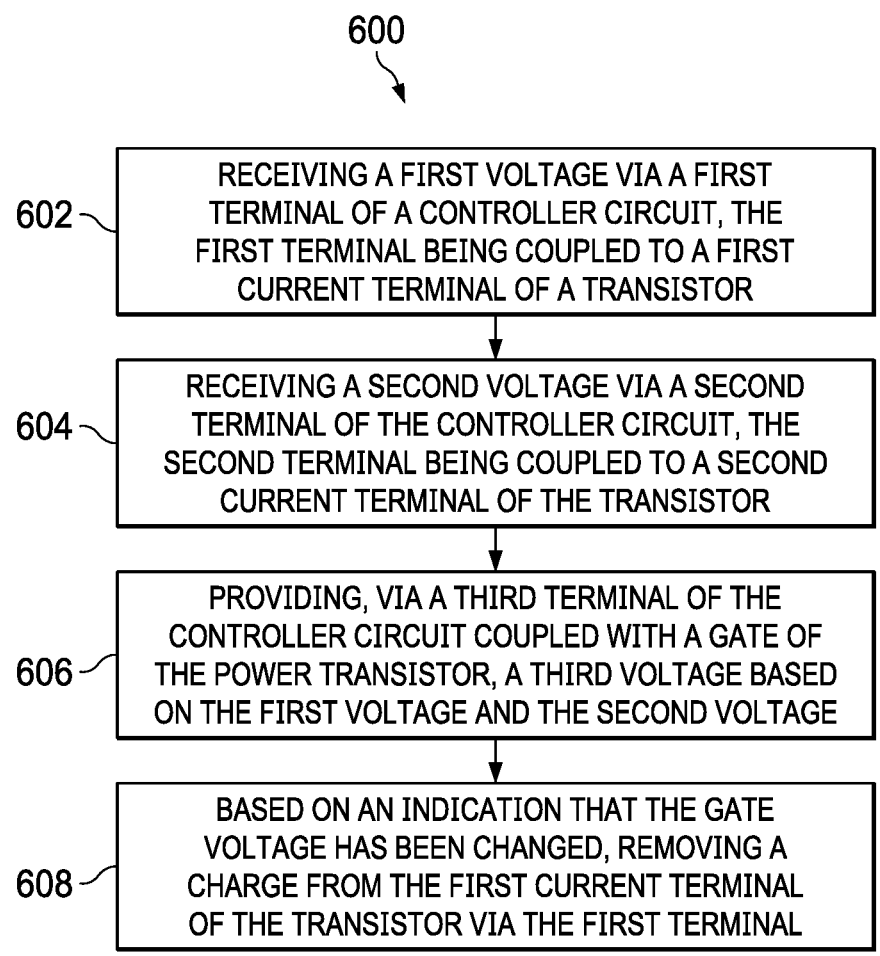
FIG. 6 is a flowchart of an example method for handling a battery loss event in accordance with various examples.

FIG. 6 is a flowchart of an example method 600 for handling a battery loss event. Method 600 can be performed, such as by controller circuit 400 of FIGS. 4A through 4D. Although the method steps are described in conjunction with FIGS. 4A through 4D, any system configured to perform the method steps, in any suitable order, is within the scope of this description.

At step 602, controller circuit 400 can receive, via a first terminal (e.g., terminal 230), a first voltage. The first terminal can be adapted to be coupled to a transistor's first current terminal (e.g., transistor 202's first current terminal 206), which can be an anode of a diode. The first current terminal can be a source if the transistor is NFET, and can be a drain if the transistor is PFET. The first current terminal can be adapted to be coupled to a battery (e.g., battery 102). The first voltage can be an anode voltage ($V_A$).

At step 604, controller circuit 400 can receive, via a second terminal (e.g., terminal 234), a second voltage. The second terminal can be adapted to be coupled to the transistor's second current terminal, which can be a cathode of the diode. The second current terminal can be a drain if the transistor is NFET, and can be a source if the transistor is PFET. The second current terminal can be adapted to be coupled to a load (e.g., load 106). The second voltage can be cathode voltage ($V_C$).

At step 606, controller circuit 400 can provide, via a third terminal (e.g., terminal 232) adapted to be coupled to a gate of the transistor, a third voltage based on the first voltage and the second voltage.

Specifically, RCB circuit 260 of controller circuit 400 can include comparators 262a and 262b to compare a difference between the first voltage (the anode voltage $V_A$) and the second voltage (the cathode voltage $V_C$) against a first threshold voltage (e.g., reverse bias threshold voltage $V_R$) to determine whether there is a reverse battery connection. RCB circuit 260 can also compare the difference against a second threshold voltage (e.g., forward conduction threshold voltage $V_{F\text{-}on}$) to determine whether to start forward conduction by transistor 202. If $V_{AC}$ is below $V_R$ and below $V_{F\text{-}on}$, RCB circuit 260 can proceed to disable transistor 202. For example, the disabling can be based on transmitting a control signal 280a to enable switch 266 coupled between the first terminal and the second terminal to bring the gate-source voltage ($V_{GS}$) of transistor 202 to zero. The disabling of transistor 202 can also trigger the start of an RCB timing window (e.g., RCB timing window 340 shown in FIG. 3B, RCB timing window 510 shown in FIG. 5A, etc.), within which RCB circuit 260 maintains transistor 202 in a disabled state and does not open switch 266 regardless of whether the anode-cathode voltage $V_{AC}$ exceeds the forward conduction threshold voltage $V_{F\text{-}on}$ or reverse bias threshold voltage $V_R$.

At step 608, based on an indication of whether the gate voltage has been changed, controller circuit 400 can remove a charge from the first current terminal of the transistor via the first terminal.

As described above, when RCB circuit 260 changes the gate-source voltage ($V_{GS}$) to disable the transistor, charge can be injected from the gate-drain parasitic capacitance ($C_{GD}$) into the anode/source of the transistor and increase the anode voltage $V_A$. If the anode-cathode voltage $V_{AC}$ goes above the forward conduction threshold voltage $V_{F\text{-}on}$, controller circuit 400 may enable the transistor to start a forward conduction from the battery to the load when in fact the battery is not connected to the transistor, and can lead to subsequent repeated enabling and disabling of the transistor as descried in FIG. 3A—FIG. 3C. Discharge circuit 402 can enable the discharge path to remove the charge that has been or will be injected by the gate-drain parasitic capacitance to reduce the likelihood of $V_{AC}$ rising above the forward conduction threshold voltage $V_{F\text{-}on}$. Discharge circuit 402 can include a pulse generator 420 to generate a pulse to enable the discharge path for a duration to remove the charge.

Discharge circuit 402 can start the pulse (and the discharge operation) based on receiving an indication that the gate voltage has been changed. The indication can be based on, for example, detecting a transition of control signal 280a that closes switch 266 to set gate-source voltage $V_{GS}$ (or source-gate voltage $V_{SG}$) to zero, a transition of the anode-cathode voltage $V_{AC}$ across a threshold (e.g., reverse bias threshold voltage $V_R$) due to injection of charge by parasitic capacitance $C_{GD}$ as the gate voltage is changed, a transition of the gate-source voltage $V_{GS}$ or $V_{SG}$ across the transistor's threshold voltage $V_{th}$, etc., all of which can indicate that the gate voltage has been changed to disable the transistor. Discharge circuit 402 can end the pulse, such as based on a predetermined delay (which can be fixed or programmable) has elapsed from the start of the pulse, the anode-cathode voltage $V_{AC}$ falling below a threshold $V_R'$ based on the reverse bias threshold voltage $V_R$, etc. In some examples, discharge circuit 402 can also end the discharge operation before the RCB timing window expires, after which RCB circuit 260 can determine whether to enable or disable transistor 202 based on new anode voltage $V_A$ and new cathode voltage $V_C$.

Accordingly, in some examples as described above, a protection system can include a controller circuit and a transistor, which can be a power transistor. Examples of protection system 100 are shown in FIG. 1 through FIG. 4B, whereas examples of controller circuit 400 are shown in FIGS. 4A through 4D. Referring to FIG. 4A, controller circuit 400 can include a first terminal (e.g., terminal 230), a second terminal (e.g., terminal 234), and a third terminal (e.g., terminal 232). The first terminal is adapted to be coupled to a first current terminal of a transistor (e.g., first current terminal 206 of transistor 202). The second terminal is adapted to be coupled to a second current terminal of the transistor (e.g., second current terminal 206 of transistor 202). The third terminal is adapted to be coupled to a gate of the transistor (e.g., gate 204). Controller circuit 400 can control the transistor to emulate an ideal diode, of which the first current terminal is the anode and the second current terminal is the cathode. The anode can be adapted to be coupled to a battery (e.g., battery 102), and the cathode can be adapted to be coupled to a load (e.g., load 106). In a case where the transistor is an NFET, the first current terminal can be a source and the second current terminal can be a drain. In a case where the transistor is a PFET, the first current terminal can be a drain and the second current terminal can be a source.

Referring to FIG. 4A, in some examples, controller circuit 400 can include a gate control circuit 250 and a discharge circuit 402. Internal components and operations of gate control circuit 250 are described in FIGS. 2A through 2F and FIGS. 4A through 4D. Gate control circuit 250 can be adapted to be coupled to the transistor via the first, second, and third terminals, and the discharge circuit can be adapted to be coupled to the source of the transistor via the first terminal. RCB circuit 260 can set a gate voltage of the transistor via terminal 232 to disable the transistor, and forward conduction control circuit 270 can set the gate voltage of the transistor via terminal 232 to enable the transistor, based on the techniques described in FIG. 2B. RCB circuit 260 can disable/remove the conduction channel of the transistor between the source and the drain, if the anode-cathode voltage $V_{AC}$ is below a reverse bias threshold voltage $V_R$. The body diode between the source and the drain can be reverse-biased, and the load can be isolated from the battery. RCB circuit 260 can also start an RCB timing window (e.g., RCB timing window 340 of FIG. 3B, RCB timing window 510 of FIG. 5A, etc.) after disabling transistor 202. RCB circuit 260 can maintain transistor 202 in the disabled state during the RCB timing window and ignore changes in the anode-cathode voltage $V_{AC}$, to avoid incorrectly enabling transistor 202 in response to transients in the anode-cathode voltage $V_{AC}$.

Also, referring to FIGS. 2A through 2F and FIGS. 4A through 4D, forward conduction control circuit 270 can set a gate voltage of the transistor to enable the transistor to transmit a positive voltage and a forward current from the battery to the load. Forward conduction control circuit 270 can enable transistor 202 if the anode-cathode voltage $V_{AC}$ exceeds a forward conduction threshold voltage $V_{F-on}$, which can be a positive threshold voltage, to start forward conduction by the transistor. Forward conduction control circuit 270 can also include a linear amplifier such as an OTA, an op-amp, etc., to implement a feedback loop to regulate the anode-cathode voltage $V_{AC}$ at a target forward voltage $V_{F-reg}$ across different forward currents $I_F$. The feedback loop can regulate $V_{AC}$ by adjusting the gate voltage via terminal 232.

Referring to FIGS. 2A through 2F and FIGS. 4A through 4D, controller circuit 400 includes a switch 266 coupled between terminals 230 and 232, and a switch 274 coupled between terminal 232 and forward conduction control circuit 270. RCB circuit 260 can close switch 266 to connect terminals 230 and 232 to set gate-source voltage ($V_{GS}$) to zero to disable transistor 202. When switch 266 is closed, RCB circuit 260 can open switch 274 to disconnect forward conduction circuit 270 from terminal 232. Moreover, when switch 266 is opened, RCB circuit 260 can close switch 274 to enable forward conduction circuit 270 to set the gate voltage.

Referring to FIGS. 4A through 4D, discharge circuit 402 can discharge the anode via terminal 230 in a battery loss event. In some examples, discharge circuit 402 can discharge a predetermined quantity of charge from the anode based on detecting that the reverse current blocking circuit disables the transistor. The quantity of charge can be based on Equation 2. Discharge circuit 402 can include a current source 414 and a switch 416 coupled between terminal 230 and a voltage reference (e.g., a ground) that can provide a charge sink. Discharge circuit 402 can also include a discharge control circuit 418 and a pulse generator 420. Discharge control circuit 418 can determine the start time and end time of the discharge operation. Pulse generator 420 can generate a pulse signal having the start time and the end time, and provide the pulse signal to close the switch 416 between the start time and the end time to perform the discharge operation.

Discharge control circuit 418 can determine the start time and the end time of the discharge operation based on various techniques. Referring to FIGS. 4A through 4D, discharge control circuit 418 can receive an indication that RCB circuit 260 disables transistor 202. The indication can be based on, for example, a control signal from RCB circuit 260 that disables transistor 202 (e.g., control signal 280a), the gate-source voltage $V_{GS}$ (or source-gate voltage $V_{SG}$ for PFET) falling below a threshold of transistor 202, the anode-cathode voltage $V_{AC}$ rising above the forward conduction threshold voltage $V_{F-on}$, etc. The start time can be based on the indication. In some examples, the end time can be by adding a predetermined delay to the start time, with the delay configured based on the total quantity of charge to be removed according to Equation 2. In some examples, the end time can be set when the anode-cathode voltage $V_{AC}$ falls below a threshold $V_R$, as the discharge operation can stop when $V_{AC}$ is no longer in the forward-bias regime. In some examples, the end time can also be set based on the RCB timing window.

With the described examples, a controller circuit operating a transistor to provide a protection system between a battery and a load can discharge the anode in a battery loss event. The discharging can be configured to prevent false detection of a forward-biased condition in the battery loss event. As a result, repeated transition between an enabled state and a disabled state of the transistor in a battery loss event can be avoided. All these can improve the predictability of the power system and the behaviors of the load in a battery loss event.

In this description, the term "couple" may cover connections, communications, or signal paths that enable a functional relationship consistent with this description. For example, if device A generates a signal to control device B to perform an action, then: (a) in a first example, device A is coupled to device B; or (b) in a second example, device A is coupled to device B through intervening component C if intervening component C does not substantially alter the functional relationship between device A and device B, so device B is controlled by device A via the control signal generated by device A. Also, in this description, a device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof. Furthermore, in this description, a circuit or device that includes certain components may instead be adapted to be coupled to those components to form the described circuitry or device. For example, a structure described as including one or more semiconductor elements (such as transistors), one or more passive elements (such as resistors, capacitors and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, such as by an end-user and/or a third party.

While certain components may be described herein as being of a particular process technology, these components may be exchanged for components of other process technologies. Circuits described herein are reconfigurable to include the replaced components to provide functionality at least partially similar to functionality available before the component replacement. Components illustrated as resistors, unless otherwise stated, are generally representative of any one or more elements coupled in series and/or parallel to provide an amount of impedance represented by the illustrated resistor. For example, a resistor or capacitor illustrated and described herein as a single component may instead be multiple resistors or capacitors, respectively, coupled in series or in parallel between the same two nodes as the single resistor or capacitor. Also, uses of the phrase "ground voltage potential" in this description include a chassis ground, an Earth ground, a floating ground, a virtual ground, a digital ground, a common ground, and/or any other form of ground connection applicable to, or suitable for, the teachings of this description. Unless otherwise stated, "about," "approximately," "nearly," or "substantially" preceding a value means+/−10 percent of the stated value.

Modifications are possible in the described examples, and other examples are possible, within the scope of the claims.

What is claimed is:

1. A controller circuit comprising:
a voltage subtractor circuit having a subtractor output and first and second subtractor inputs, in which the first subtractor input is adapted to be coupled to a first current terminal of a transistor, the second subtractor input is adapted to be coupled to a second current terminal of the transistor;
a gate control circuit having a gate control input and a gate control output, the gate control input coupled to the subtractor output, the gate control output adapted to be coupled to a gate of the transistor; and
a discharge circuit having a discharge circuit input and a discharge circuit output, the discharge circuit input coupled to the gate control circuit, the discharge circuit output adapted to be coupled to the first current terminal of the transistor.

2. The controller circuit of claim 1, wherein the discharge circuit is configured to:
receive, via the discharge circuit input, an indication of whether a gate voltage of the transistor at the gate control output has been changed; and
responsive to receiving the indication, remove a charge from the first current terminal via the discharge circuit output.

3. The controller circuit of claim 2, wherein the indication is based on at least one of: (a) a transition in a control signal generated by the gate control circuit to change a gate voltage of the transistor; (b) a change in the gate voltage; or (c) a change in a difference voltage between a first voltage at the first current terminal and a second voltage at the second current terminal.

4. The controller circuit of claim 2, wherein the discharge circuit includes a current source and a switch coupled between the discharge circuit output and a voltage source, the voltage source configured to be a charge sink; and
wherein the discharge circuit includes:
a discharge control circuit having a discharge control input and a discharge control output, the discharge control input coupled to the discharge circuit input, and the discharge control circuit configured to:
determine a start time and an end time of a discharge operation based on a timing of the indication; and
provide, at the discharge control output, a first control signal and a second control signal indicating, respectively, the start time and the end time of the discharge operation;
and
a pulse generator having a pulse generator input and a pulse generator output, the pulse generator input coupled to the discharge control output, the pulse generator output coupled to the switch, the pulse generator configured to:
generate a pulse signal responsive to receiving the first and second control signals; and
provide the pulse signal at the pulse generator output.

5. The controller circuit of claim 4, wherein the gate control output is a first gate control output; and
wherein the gate control circuit has a second gate control output coupled to the discharge control input, and the gate control circuit is configured to:
receive, from the gate control input, a difference voltage indicating a difference between a first voltage at the first current terminal and a second voltage at the second current terminal;
generate a third control signal responsive to the difference voltage;
provide a gate voltage at the first gate control output responsive to the third control signal; and
provide the third control signal at the second gate control output;
in which the discharge control circuit is configured to generate the first control signal responsive to detecting a transition of the third control signal.

6. The controller circuit of claim 4, wherein the discharge control input is coupled to the gate control input; and
wherein the discharge control circuit includes a comparator having a comparator output and first and second comparator inputs, the comparator output is coupled to the discharge control output, the first comparator input is coupled to the discharge control input, and the comparator is configured to provide, at the comparator output, the first control signal responsive to a difference voltage at the first comparator input and a threshold voltage at the second comparator input,
in which the difference voltage indicates a difference between a first voltage at the first current terminal and a second voltage at the second current terminal, and the first control signal indicates a timing of when the difference voltage exceeds the threshold voltage.

7. The controller circuit of claim 4, wherein:
the discharge control input is a first discharge control input coupled to the first subtractor input;
the discharge control circuit has a second discharge control input coupled to the gate control output;
the voltage subtractor circuit is a first voltage subtractor circuit;
the subtractor output is a first subtractor output; and
the discharge control circuit includes:
a second voltage subtractor circuit having a second subtractor output and third and fourth subtractor inputs, the third subtractor input coupled to the first discharge control input, the fourth subtractor input coupled to the second discharge control input, and the second voltage subtractor circuit configured to provide, at the second subtractor output, a difference voltage between a first voltage at the first current terminal and a second voltage at the gate; and
a comparator having a comparator output and first and second comparator inputs, the comparator output coupled to the discharge control output, the first comparator input coupled to the second subtractor output, and the comparator configured to provide, at the comparator output, the first control signal responsive to the difference voltage at the first comparator input and a threshold voltage at the second comparator input;
in which the first control signal is generated responsive to the difference voltage being below the threshold voltage.

8. The controller circuit of claim 4, wherein the discharge control circuit includes a delay circuit having a delay circuit input and a delay circuit output, the delay circuit output coupled to the discharge control output, and the delay circuit is configured to:
receive, via the delay circuit input, the first control signal; and
provide, at the discharge control output, the second control signal by adding a predetermined delay to the first control signal.

9. The controller circuit of claim 8, wherein the delay reflects a total quantity of the charge to be removed from the source of the transistor.

10. The controller circuit of claim 8, wherein the delay circuit includes programmable delay elements.

11. The controller circuit of claim 4, wherein the discharge control input is coupled to the gate control input; and
wherein the discharge control circuit includes a comparator having a comparator output and first and second comparator inputs, the comparator output is coupled to the discharge control output, the first comparator input is coupled to the discharge control input, and the comparator is configured to provide, at the comparator output, the first control signal responsive to a difference voltage at the first comparator input and a threshold voltage at the second comparator input,
in which the difference voltage indicates a difference between a first voltage at the first current terminal and a second voltage at the second current terminal, and the second control signal indicates a timing of when the difference voltage falls below the threshold voltage.

12. The controller circuit of claim 1, wherein the voltage subtractor circuit is configured to provide, at the subtractor output, a difference voltage indicating a difference between a first voltage at the first current terminal and a second voltage at the second current terminal; and
wherein the gate control circuit includes:
a first comparator having a first comparator output and first and second comparator inputs, the first comparator input coupled to the gate control input, and the first comparator configured to provide, at the first comparator output, a first decision signal responsive to the difference voltage and a first threshold voltage at the second comparator input;
a second comparator having a second comparator output and third and fourth comparator inputs, the third comparator input coupled to the gate control input, and the second comparator configured to provide, at the second comparator output, a second decision signal responsive to the difference voltage and a second threshold voltage at the fourth comparator input, in which the second threshold voltage is higher than the first threshold voltage; and
a logic circuit having a logic circuit output and first and second logic inputs, the first logic input coupled to the first comparator output, the second logic input coupled to the second comparator output, the logic circuit output coupled to the gate control output, the logic circuit configured to provide, responsive to the first decision signal and the second decision signal, a control signal at the logic circuit output.

13. The controller circuit of claim 12, wherein the control signal is a first control signal;
wherein the difference voltage is a first difference voltage; and
wherein the logic circuit is configured to:
responsive to generating the first control signal to disable the transistor, start a timing window in which the logic circuit provides the first control signal to disable the transistor; and
after the timing window expires:
receive, from the first comparator and the second comparator respectively, a third decision signal and a fourth decision signal generated from a second difference voltage indicating a difference between the first voltage and the second voltage received after the timing window expires; and
provide, responsive to the third decision signal and the fourth decision signal, a second control signal at the logic circuit output.

14. The controller circuit of claim 12, wherein:
the gate control input is a first gate control input;
the gate control circuit has a second gate control input adapted to be coupled to the first current terminal;
the gate control circuit includes a switch coupled between the second gate control input and the gate control output; and
the logic circuit output coupled to the switch.

15. The controller circuit of claim 14, wherein:
the switch is a first switch;
the control signal is a first control signal; and
the gate control circuit includes:
an amplifier having an amplifier output and first and second amplifier inputs, the first amplifier input coupled to the gate control input, and the amplifier configured to provide the third voltage, in which the third voltage is linearly related to a difference between the difference voltage at the first amplifier input and a third threshold voltage at the second amplifier input, and the third threshold is between the first and second threshold voltages;

a second switch coupled between the amplifier output and the gate control output; and an inverter having an inverter input and an inverter output, the inverter input coupled to the logic circuit output, the inverter output coupled to the second switch, and the inverter configured to provide, at the inverter output, a second control signal inverted from the first control signal.

16. The controller circuit of claim 1, wherein:

the transistor is an N-type transistor;

the first current terminal is a source of the transistor and is an anode of a diode; and the second current terminal is a drain of the transistor and is a cathode of the diode.

17. The controller circuit of claim 1, wherein:

the first current terminal is adapted to be coupled to a battery to receive electric power;

the second current terminal is adapted to be coupled to a load to provide at least some of the electric power;

the controller circuit is configured to control the transistor to emulate a diode having the first current terminal as the anode and the second current terminal as the cathode; and the discharge circuit is configured to remove a charge from the first current terminal via the discharge circuit output in a battery loss event in which the battery no longer supplies the electric power to the source.

18. A controller circuit comprising:

a voltage subtractor circuit having a subtractor output and first and second subtractor inputs, in which the first subtractor input is adapted to be coupled to a transistor's first current terminal as an anode of a diode, and the second subtractor input is adapted to be coupled to the transistor's second current terminal as a cathode of the diode;

a gate control circuit having a gate control input and a gate control output, the gate control input coupled to the subtractor output, the gate control output adapted to be coupled to a gate of the transistor; and a discharge circuit having a discharge circuit input and a discharge circuit output, the discharge circuit output adapted to be coupled to the first current terminal of the transistor, and the discharge circuit configured to:

receive, via the discharge circuit input, an indication of whether a gate voltage of the transistor at the gate control output has been changed; and responsive to receiving the indication, remove a charge from the first current terminal via the discharge circuit output.

19. The controller circuit of claim 18, wherein the indication is based on at least one of: (a) a transition in a control signal generated by the gate control circuit to change a gate voltage of the transistor; (b) a change in the gate voltage; or (c) a change in a difference between a first voltage at the first current terminal and a second voltage at the second current terminal.

20. The controller circuit of claim 18, wherein:

the first current terminal is adapted to be coupled to a battery to receive electric power;

the second current terminal is adapted to be coupled to a load to provide at least some of the electric power;

the controller circuit is configured to control the transistor to emulate a diode having an anode and a cathode at, respectively, the first current terminal and the second current terminal as the cathode; and the discharge circuit is configured to remove a charge from the first current terminal via the discharge circuit output in a battery loss event in which the battery no longer supplies the electric power to the source.

21. A method comprising:

receiving a first voltage via a first terminal of a controller circuit, the first terminal being coupled to a transistor's first current terminal as an anode;

receiving a second voltage via a second terminal of the controller circuit, the second terminal being coupled to the transistor's second current terminal as a cathode;

providing, via a third terminal of the controller circuit coupled to a gate of the transistor, and based on the first voltage and the second voltage, a gate voltage of the transistor; and based on an indication of whether the gate voltage has been changed, removing a charge from the first current terminal of the transistor via the first terminal.

\* \* \* \* \*